US008601712B2

(12) United States Patent
Hubbard, Jr. et al.

(10) Patent No.: US 8,601,712 B2
(45) Date of Patent: Dec. 10, 2013

(54) SYSTEM AND METHOD FOR SPRAY DRYING A LIQUID

(71) Applicant: Velico Medical, Inc., Beverly, MA (US)

(72) Inventors: Dennis Brian Hubbard, Jr., Lancaster, MA (US); Michael Haley, Marlboro, MA (US); John Charles Rosenfelder, New Ipswich, NH (US); George T. Perivolotis, Littleton, MA (US)

(73) Assignee: Velico Medical, Inc., Beverly, MA (US)

( * ) Notice: Subject to any disclaimer, the term of this patent is extended or adjusted under 35 U.S.C. 154(b) by 0 days.

(21) Appl. No.: 13/660,387

(22) Filed: Oct. 25, 2012

(65) Prior Publication Data
US 2013/0048225 A1    Feb. 28, 2013

Related U.S. Application Data

(62) Division of application No. 13/284,320, filed on Oct. 28, 2011.

(60) Provisional application No. 61/408,438, filed on Oct. 29, 2010.

(51) Int. Cl.
*F26B 3/00*    (2006.01)

(52) U.S. Cl.
USPC ......... 34/78; 34/80; 34/210; 34/218; 159/4.2; 239/8

(58) Field of Classification Search
USPC ................ 34/77, 78, 80, 201, 210, 218, 242; 159/4.01, 4.2; 239/8, 11
See application file for complete search history.

(56) References Cited

U.S. PATENT DOCUMENTS

| | | | |
|---|---|---|---|
| 2,411,152 | A | 11/1946 | Folsom |
| 2,528,476 | A | 10/1950 | Roos et al. |
| 3,228,838 | A | 1/1966 | Rinfret et al. |
| 3,230,689 | A | 1/1966 | Hussmann |

(Continued)

FOREIGN PATENT DOCUMENTS

| | | |
|---|---|---|
| CA | 1182411 | 2/1985 |
| CA | 2065582 | 10/1992 |

(Continued)

OTHER PUBLICATIONS

Civil Action Cover Sheet; *Entegrion, Inc.* vs *Velico Medical, Inc.*, dated Oct. 19, 2012.

(Continued)

*Primary Examiner* — Steve M Gravini
(74) *Attorney, Agent, or Firm* — Pierce Atwood LLP; Joseph M. Maraia

(57) ABSTRACT

Described herein are devices and techniques for spray drying a fluid to produce a dried powder. Assemblies include a spray drying head attachable to a gas supplier and a liquid sample, such as a standard unit of blood product. The spray drying head can be adapted to provide an aerosolized flow of liquid sample exposed to a drying gas. The assembly also includes a drying chamber adapted to separate the aerosolized flow of liquid sample into a dried powder and humid air. The assembly can be disposable, provided in a sterilized kit and having simplified attachments allowing quick connect and disconnect from the gas and liquid sample. Separation of the powder from the humid air exiting the drying chamber occurs within a filtered collection bag. In some embodiments, one or more of the drying chamber and collection bag are formed form a thin-walled, collapsible material.

9 Claims, 19 Drawing Sheets

(56) References Cited

U.S. PATENT DOCUMENTS

| | | | |
|---|---|---|---|
| 3,449,124 A | 6/1969 | Lipner | |
| 3,507,278 A | 4/1970 | Werding | |
| 3,644,128 A | 2/1972 | Lipner | |
| 3,654,705 A | 4/1972 | Smith et al. | |
| 4,187,617 A | 2/1980 | Becker, Jr. et al. | |
| 4,251,510 A | 2/1981 | Tankersley | |
| 4,347,259 A | 8/1982 | Suzuki et al. | |
| 4,358,901 A | 11/1982 | Takabatake et al. | |
| 4,378,346 A | 3/1983 | Tankersley | |
| 4,787,154 A | 11/1988 | Titus | |
| 5,096,537 A | 3/1992 | Bergquist et al. | |
| 5,145,706 A | 9/1992 | Hagi et al. | |
| 5,252,221 A | 10/1993 | van Dommelen et al. | |
| 5,372,811 A | 12/1994 | Yoder | |
| 5,522,156 A | 6/1996 | Ware | |
| 5,562,919 A | 10/1996 | Doty et al. | |
| 5,575,999 A | 11/1996 | Yoder | |
| 5,581,903 A | 12/1996 | Botich | |
| 5,647,142 A | 7/1997 | Andersen et al. | |
| 5,727,333 A | 3/1998 | Folan | |
| 5,924,216 A | 7/1999 | Takahashi | |
| 5,993,804 A | 11/1999 | Read et al. | |
| 6,004,576 A | 12/1999 | Weaver et al. | |
| 6,148,536 A | 11/2000 | Lijima | |
| 6,308,434 B1 | 10/2001 | Chickering, III et al. | |
| 6,345,452 B1 | 2/2002 | Feuilloley et al. | |
| 6,463,675 B1 | 10/2002 | Hansen et al. | |
| 6,523,276 B1 | 2/2003 | Meldrum | |
| 6,526,774 B1 | 3/2003 | Lu et al. | |
| 6,560,897 B2 | 5/2003 | Chickering, III et al. | |
| 6,569,447 B2 | 5/2003 | Kisic et al. | |
| 6,582,654 B1 | 6/2003 | Kral et al. | |
| 6,723,497 B2 | 4/2004 | Wolkers et al. | |
| 7,007,406 B2 | 3/2006 | Wang et al. | |
| 7,089,681 B2 | 8/2006 | Herbert et al. | |
| 7,419,682 B2 | 9/2008 | Campbell et al. | |
| 7,527,805 B2 | 5/2009 | Crenshaw et al. | |
| 8,322,046 B2 | 12/2012 | Wang et al. | |
| 2002/0122803 A1 | 9/2002 | Kisic et al. | |
| 2002/0182195 A1 | 12/2002 | Marguerre et al. | |
| 2003/0037459 A1 | 2/2003 | Chickering, III et al. | |
| 2003/0099633 A1 | 5/2003 | Campbell et al. | |
| 2003/0103962 A1 | 6/2003 | Campbell et al. | |
| 2003/0143518 A1 | 7/2003 | Luck et al. | |
| 2003/0180283 A1 | 9/2003 | Batycky et al. | |
| 2003/0190314 A1 | 10/2003 | Campbell et al. | |
| 2004/0146565 A1 | 7/2004 | Strohbehn et al. | |
| 2004/0202660 A1 | 10/2004 | Campbell et al. | |
| 2005/0170068 A1 | 8/2005 | Roodink et al. | |
| 2005/0271674 A1 | 12/2005 | Campbell et al. | |
| 2006/0045907 A1 | 3/2006 | Campbell et al. | |
| 2006/0088642 A1 | 4/2006 | Boersen et al. | |
| 2006/0130768 A1 | 6/2006 | Crenshaw et al. | |
| 2006/0216687 A1 | 9/2006 | Alves-Filho et al. | |
| 2007/0014806 A1 | 1/2007 | Marguerre et al. | |
| 2008/0060213 A1 | 3/2008 | Gehrmann et al. | |
| 2008/0138340 A1 | 6/2008 | Campbell et al. | |
| 2008/0145444 A1 | 6/2008 | Merchant et al. | |
| 2008/0213263 A1 | 9/2008 | Campbell et al. | |
| 2009/0092678 A1 | 4/2009 | Marguerre et al. | |
| 2009/0155410 A1 | 6/2009 | Crenshaw et al. | |
| 2010/0215667 A1 | 8/2010 | Campbell et al. | |
| 2012/0167405 A1 | 7/2012 | Hubbard, Jr. et al. | |

FOREIGN PATENT DOCUMENTS

| | | |
|---|---|---|
| CH | 622683 | 4/1981 |
| CN | 1315139 | 10/2001 |
| DE | 3507278 A1 | 9/1986 |
| EP | 0058903 | 9/1982 |
| EP | 1050220 A1 | 8/2000 |
| GB | 573500 | 11/1945 |
| GB | 886533 | 10/1962 |
| GB | 964367 | 7/1964 |
| GB | 975786 | 11/1964 |
| GB | 1188168 | 4/1970 |
| GB | 2003042 | 3/1979 |
| JP | 56011903 | 2/1981 |
| JP | 63218201 | 9/1988 |
| JP | 01011618 | 1/1989 |
| JP | 03131302 | 6/1991 |
| JP | 03181301 | 8/1991 |
| JP | 5245301 | 9/1993 |
| JP | 525910 | 10/1993 |
| JP | 10182124 | 7/1998 |
| JP | 2002009037 | 1/2002 |
| JP | 2005191275 | 7/2005 |
| JP | 2007216158 | 8/2007 |
| WO | 9615849 | 5/1996 |
| WO | 9618312 | 6/1996 |
| WO | 9738578 | 10/1997 |
| WO | 9907236 | 2/1999 |
| WO | 9907390 | 2/1999 |
| WO | 0056166 | 9/2000 |
| WO | 0172141 | 10/2001 |
| WO | 02078741 | 10/2002 |
| WO | 02078742 | 10/2002 |
| WO | 02/092213 | 11/2002 |
| WO | 03030654 | 4/2003 |
| WO | 03030918 | 4/2003 |
| WO | 03063607 | 8/2003 |
| WO | 2004075988 | 9/2004 |
| WO | 2007036227 | 4/2007 |
| WO | 2008/122288 | 10/2008 |
| WO | 2010117976 | 10/2010 |

OTHER PUBLICATIONS

Complaint including Exhibit A, B, and C; *Entegrion, Inc.* vs *Velico Medical, Inc.*, dated Oct. 19, 2012.
Mini Spray Dryer B-290—Application Note; www.buchi.com; Mar. 30, 2008.
Nano Spray Dryer B-90; www.buchi.com; Jul. 18, 2011.
Mini Spray Dryer System Configuration; www.buchi.com; Jan. 8, 2007.
Quick Operation Guide; Mini Spray Dryer B-290; www.buchi.com; Sep. 16, 2004.
Process Parameters; www.buchi.com; Nov. 21, 2008.
Training Papers Spray Drying; Version B; www.buchi.com; 19 pages; Oct. 29, 2002.
Mini Spray Dryer B-290; www.buchi.com; May 10, 2007.
Operation Manual; Mini Spray Dryer B-290; Version G; www.buchi.com; Feb. 8, 2007.
PCT International Search Report and Written Opinion; PCT/US2010/049176; Nov. 4, 2010.
Edwards et al., The Preparation and Use of Dried Plasma for Transfusion; British Medical journal; vol. 1, No. 4131; Mar. 9, 1940; pp. 377-381.
PCT International Search Report from International Application No. PCT/US2011/058358, filed Oct. 28, 2011, mailed Jul. 4, 2012.
Answer, Affirmative Defenses, Counterclaims, Cross-Claims and Jury Demand, *Entegrion, Inc.* vs *Velico Medical, Inc.*, dated Dec. 3, 2012.

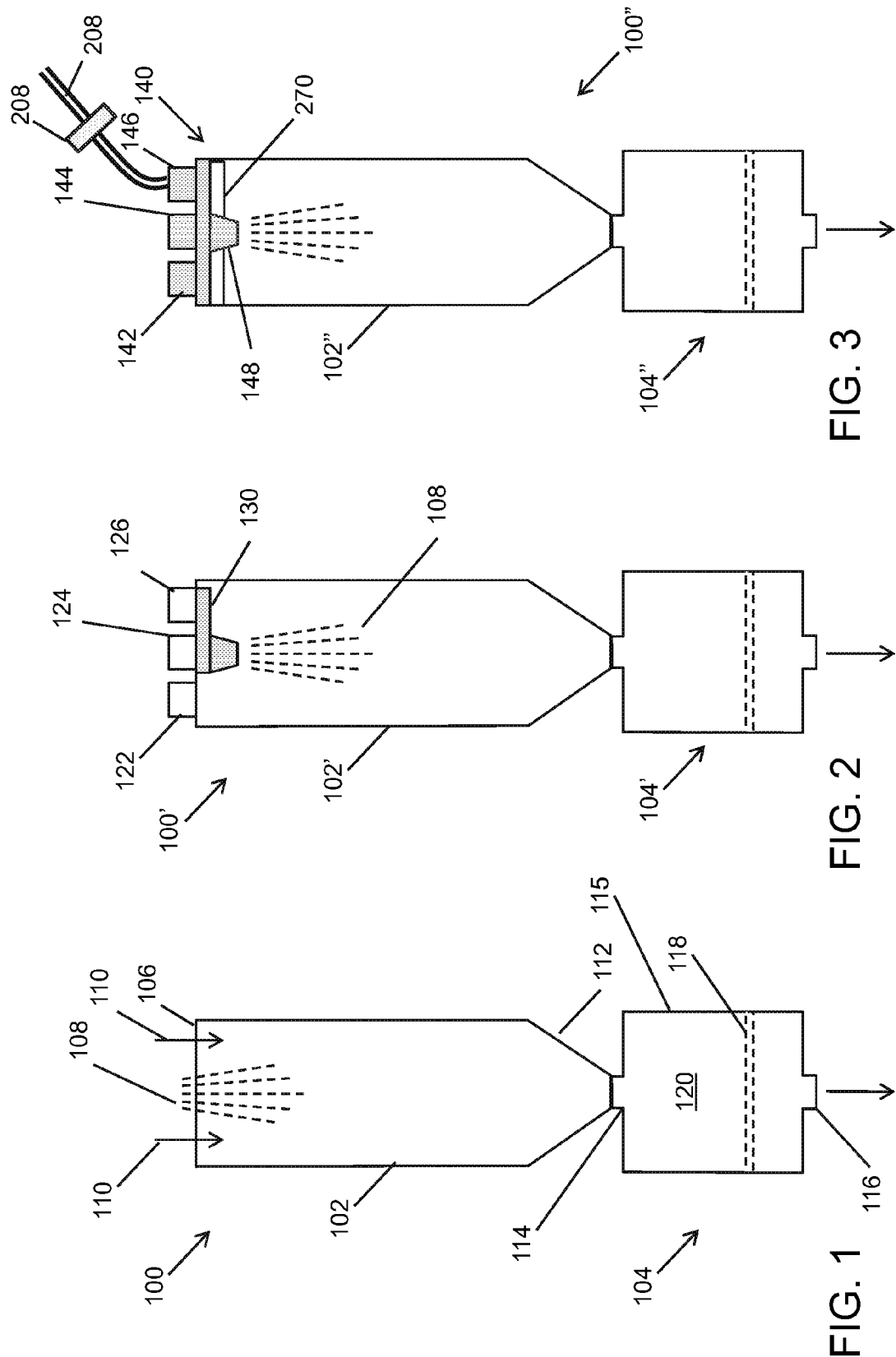

750

755 AEROSOLIZE

760 DRY

765 SEPARATE/COLLECT

FIG. 19

SYSTEM AND METHOD FOR SPRAY DRYING A LIQUID

RELATED APPLICATIONS

The present application is a divisional application of U.S. patent application Ser. No. 13/284,320, filed on Oct. 28, 2011, which claims priority to U.S. Provisional Patent Application No. 61/408,438, filed Oct. 29, 2010. The entire teachings of the above applications are incorporated herein by reference.

FIELD OF THE INVENTION

The present invention relates generally to devices and techniques for producing and/or using spray-dried products, and more particularly to such devices and techniques for producing and/or using spray-dried products for treatment of a human.

BACKGROUND

Blood plasma is the yellow liquid component of blood, in which the blood cells of whole blood would normally be suspended. Blood plasma makes up about 55% of the total blood volume. Blood plasma is mostly water (e.g., about 90% by volume) and contains dissolved proteins, glucose, clotting factors, mineral ions, hormones, and/or carbon dioxide. Blood plasma is prepared by spinning a sample volume of fresh blood in a centrifuge until the blood cells fall to the bottom of a sample chamber. The blood plasma is then poured or drawn off. Blood plasma is frequently frozen fresh for future uses. Although frozen plasma is the current standard of care, there are numerous problems with such techniques. For example, the bag containing the frozen plasma may become brittle and be damaged during storage or transportation. Maintaining frozen plasma at the appropriate temperature during storage and transportation is very expensive. It requires mechanical freezers to keep the frozen plasma at about −18° C. or lower. Shipping requires special shipping containers to maintain the frozen state and reduce breakage of the bag. Use of the frozen plasma is delayed by 30-45 minutes due to the thawing time. Moreover, the preparation for use requires trained staff and specialized thawing devices in a regulated laboratory. Finally, fresh frozen plasma has a limited shelf life of 12 months at −18° C. Once thawed, the frozen plasma must be used within 24 hours.

In an attempt to avoid the disadvantages of frozen plasma, some have freeze dried (i.e., lyophilized) plasma. However, the freeze drying process produces a product composed of large, irregular sized grains or particles. Such products can be difficult or impossible to rehydrate to a form suitable for administration to a patient. Furthermore, the freeze drying process requires transfer of the product from the lyophilizer to the final container, thus requiring post-processing sterility testing. The freeze drying process can only be done in batch mode; continuous processing is not possible with freeze drying. Moreover, manufacturing scale-up requires changes to the freeze drying process, and there are protein recovery issues at scale up.

Accordingly, a need still exists in the field for plasma that may be stored in a wide range of environments without freezers or refrigerators, be available for use by first responders at the initial point of care, and can be transfused in minutes without the usual 30-45 minute delay associated with thawing of frozen plasma.

SUMMARY

The devices and techniques described herein provide an extracorporeal, sterile, closed plasma processing system, which can be used to produce a spray dried, physiologically active plasma powder that has a long storage life at room temperature; that can be easily stored and shipped; that is versatile, durable and simple; and that can be easily and rapidly rehydrated and used at the point of care. The processing system can produce spray dried powder in either a batch (e.g., single unit) or a continuous (e.g., pooled units) processing mode. The spray dried powder can be dried directly into the final, attached sterile container, which can later be rapidly and easily rehydrated to produce transfusion grade plasma. The spray dried powder can be stored for at least up to three years at virtually any temperature (e.g., −180° C. to 50° C.). The costs associated with storage and shipping of the spray dried powder is significantly lower, because of its lighter weight and broader range of temperature tolerance compared to frozen plasma. At the point of care, the spray dried powder can be rapidly rehydrated in a transfusable form (e.g., 30-120 seconds), avoiding the need for special equipment and trained staff. In contrast to frozen plasma, which takes 30-45 minutes to thaw and must be used within 24 hours, the spray dried powder obtained using the devices and techniques described herein avoids waste, since the caregiver can rapidly prepare the amount of rehydrated plasma required for a given patient, rather than trying to assess and predict the amount of plasma required and thawing sufficient plasma to meet an anticipated need, which may have been an overestimate.

In one aspect, at least one embodiment described herein relates to a spray drying assembly. The spray drying assembly includes a spray drying head attachable to a gas supplier and a liquid sample. The spray drying head is adapted to provide an aerosolized flow of liquid plasma exposed to a drying gas. The assembly also includes a drying chamber adapted to separate the aerosolized flow of liquid sample into a dried powder and humid air. The drying chamber defines an elongated central lumen open at one end to receive the aerosolized flow of liquid sample and drying gas. The drying chamber is also open at an opposite end allowing for discharge of dried powder and humid air. The assembly further includes a collection device. The collection device includes an inlet port in fluid communication with the opposite end of the drying chamber; a filter adapted to separate the dried powder from the humid air; and an exhaust port allowing humid air to exit the collection device.

In another aspect, at least one embodiment described herein relates to a spray drying chamber. The spray drying chamber includes an elongated side wall extending between two open ends and defining a central lumen extending along a longitudinal axis. The chamber also includes a reducing wall extending between an open widened end and an open narrowed end. The opened widened end is attached to one of the open ends of the elongated side wall. An attachment flange is attached to the open narrowed end of the reducing wall and adapted for attachment to a collection device. The elongated side wall, reducing wall and attachment flange define a fluid-tight open channel extending along the longitudinal axis.

In another aspect, at least one embodiment described herein relates to a spray drying head. The spray drying head includes a spray-drying chamber cover adapted to form a fluid-tight attachment to an open end of a spray drying chamber. The spray drying head also includes a gas supply interface adapted to receive at least a relatively low-pressure flow of heated drying air and a relatively high-pressure flow of aerosolizing gas. A fluid interface is adapted to receive a liquid sample; at least one filter positioned to filter the flow of heated drying air. A nozzle is also provided and adapted to produce an aerosolized flow of the liquid sample.

In another aspect, at least one embodiment described herein relates to a spray drying collection device. The collection device includes an inlet port in fluid communication with the opposite end of the drying chamber and a filter adapted to separate the dried powder from the humid air. An exhaust port allows humid air to exit the collection device.

In yet another aspect, at least one embodiment described herein relates to a process for spray drying a liquid. The process includes aerosolizing a flow of liquid sample. The aerosolized flow of liquid sample is exposed to a heated drying gas adapted for separating the aerosolized flow of liquid sample into a dried powder and humid air. The dried powder is then filtered from the humid air.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 1 illustrates a schematic diagram of an embodiment of a spray drying and collection assembly.

FIG. 2 illustrates a schematic diagram of another embodiment of a spray drying and collection assembly.

FIG. 3 illustrates a schematic diagram of another embodiment of a spray drying and collection assembly.

FIG. 19 illustrates a flow diagram of an embodiment of process for spray drying a liquid.

DETAILED DESCRIPTION

Figure 4:
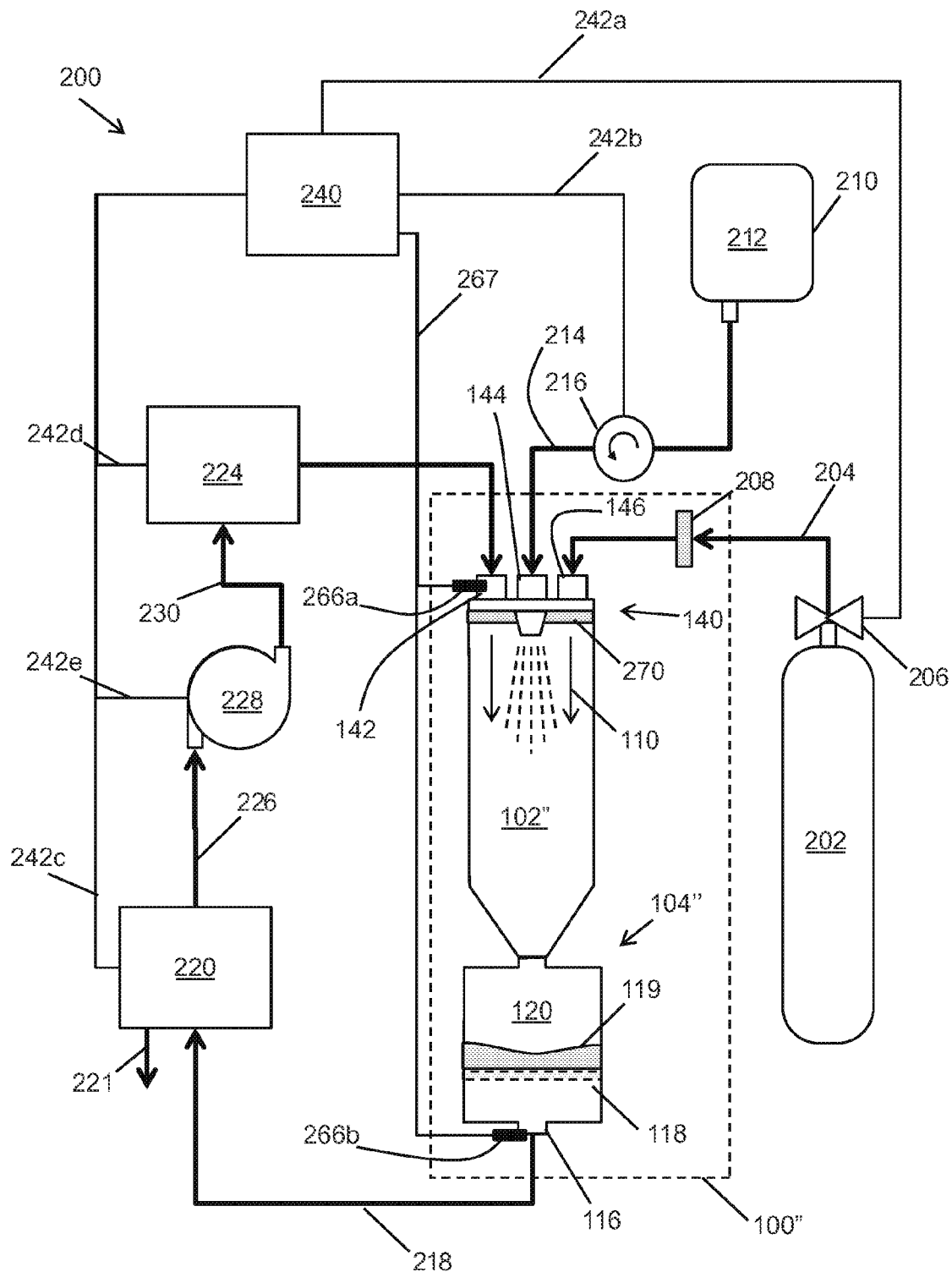
FIG. 4 illustrates a schematic diagram of an embodiment of a spray drying system.

Described herein are devices and techniques for spray drying a fluid (e.g., blood plasma, whole blood, etc.) to produce a dried powder (e.g., spray dried powder). The devices can include a spray drying assembly. The spray drying assembly can include the spray drying head attachable to a gas supplier and a liquid sample. The spray drying head can be adapted to provide an aerosolized flow of liquid sample (e.g., blood plasma, whole blood, etc.) exposed to a drying gas (e.g., heated air, heated nitrogen, etc.). The assembly also includes a drying chamber adapted to convert the aerosolized flow of liquid sample into a dried powder and humid air. Preferably, the assembly is disposable, collapsible, provided in a sterilized kit, and/or having simplified attachments allowing quick connect and disconnect from the gas and liquid sample. Separation of the powder from the humid air exiting the drying chamber occurs within a filtered collection bag. The collection bag can be sealed and separated from the assembly to allow for transport and storage of spray dried powder. The spray dried powder can be later rehydrated using a rehydration fluid to produce transfusion grade plasma for administration to a patient. In at least some embodiments, the storage bag further includes a feature with rehydration fluid (e.g., sterile fluid, saline, water, etc.) for rehydration of the powder into a fluid.

A schematic diagram of an embodiment of a spray drying and collection assembly is illustrated in FIG. 1. The spray drying assembly 100 includes a drying chamber 102 and a collection sub assembly 104. In at least some embodiments, the drying chamber 102 is an elongated hollow structure having a chamber inlet 106 at one end. The chamber inlet 106 is sized and shaped to accept an aerosolized liquid sample 108 (e.g., blood plasma, whole blood, etc) and heated drying air 110. The aerosolized liquid sample 108 and heated drying air 110 are generally directed towards an opposing narrowed end 112 of the drying chamber 102.

The collection sub assembly 104 includes an enclosed bag 115 having an intake port 114 at one end, an exhaust port 116 at another end, and a filter 118 positioned between the intake port 114 and exhaust port 116. The filter 118 at least partially defines a collection chamber 120 within the enclosed bag 115. In the illustrative embodiment, a perimeter of the filter 118 is positioned in a sealing arrangement with an interior surface of the bag 115, such that the collection chamber 120 is partially formed by an upper interior portion of the bag 115 and an upper surface of the filter 118.

The intake port 114 is in fluid communication with the opening at the narrowed end 112 of the drying chamber 102. Drying air 110 interacts with the aerosolized liquid sample 108 within the drying chamber 102. In the illustrative embodiment, the drying chamber 102, intake port 114 and exhaust port 116 are substantially aligned along a common longitudinal axis. The general direction of the drying air 110 and aerosolized liquid sample 108 is towards the narrowed end 112. Various parameters, such as the temperature and pressure of the drying air 110 can be controlled to interact favorably with the aerosolized liquid sample 108, such that a substantially dried powder and humid air exit the narrowed end 112. The filter 118 is selected to trap or otherwise inhibit passage of a substantial portion, if not all of the powder, allowing the humid air to pass through. The humid air ultimately exits the bag 115 through the exhaust port, leaving a collected powder sample within the collection chamber 120. Other variables, such as liquid sample size, particulars of the aerosolized liquid sample, such as droplet size and velocity, control drying time and volume of collected sample.

As illustrated in FIG. 1, the processing of the liquid sample into the dried powder is performed in a substantially linear pathway through the drying chamber 102 and the collection sub assembly 104, thereby advantageously reducing a collection of materials within the components (e.g., collection of materials at a bend, collection of materials at a narrow component, etc.). In some examples, the drying chamber 102 and the collection sub assembly 104 are single unit (e.g., manufactured as a single plastic piece) with a detachable, sealing mechanism (e.g., self-sealing interface, valve, etc.) positioned at the intake port 114. In other examples, the drying chamber 102 and the collection sub assembly 104 are collapsible along a central axis (e.g., accordion collapse) of the drying chamber 102 and the collection sub assembly 104. In some examples, the drying chamber 102 and the collection sub assembly 104 are collapsible perpendicular from the central axis (e.g., folding collapse) of the drying chamber 102 and the collection sub assembly 104. The collapsibility of the drying chamber 102 and the collection sub assembly 104 advantageously enables the components to be stored in a compact sterile container, thereby reducing the cost for storage and shipping of the components.

A schematic diagram of another embodiment of a spray drying and collection assembly 100' is illustrated in FIG. 2. Similarly, the assembly 100' includes a drying chamber 102' in fluid communication with a collection sub assembly 104'. The drying chamber 102' includes a drying gas port 122, a liquid sample port 124 and an aerosolizing gas port 126. Each of the liquid sample port 124 and the aerosolizing gas port 126 is in fluid communication with a nozzle 130. The nozzle 130 is configured to produce an aerosolized liquid sample 108 within an interior region of the drying chamber 102', such that the aerosolized sample 108 is exposed to drying air 110, producing a dried powder, collectable at the collection sub assembly 104'. The nozzle 130 is configured to deliver the drying air 110 at a rate (e.g., 21 cubic feet per minute (cfm) at less than 2 pounds per square inch (psig), 40 cfm at 5 psig, etc.) and a temperature (e.g., 112° Celsius, 105° Celsius, etc.) to minimize the moisture content within the dried plasma (e.g., less than 5% moisture, between 2-5% moisture, etc.) while maximizing the efficacy of the rehydrated plasma (e.g., 90% physiologically active, greater than 80% physiologically active).

Shown in FIG. 3 is a schematic diagram of yet another embodiment of a spray drying and collection assembly 100". In a like manner, the assembly 100" includes a drying chamber 102" in fluid communication with a collection sub assembly 104". Positioned in a sealing arrangement at one end of the drying chamber 102" is a spray drying head assembly 140. The spray drying head 140 includes a drying gas port 142, a liquid sample port 144 and an aerosolizing gas port 146. Each of the liquid sample port 144 and the aerosolizing gas port 146 is in fluid communication with a nozzle 148. The nozzle 148, in combination with external sources of drying air and aerosolizing gas are likewise configured to produce an aerosolized liquid sample 108 within an interior region of the drying chamber 102", such that the aerosolized sample 108 is exposed to drying air 110, once again, producing a dried powder, collectable at the collection sub assembly 104". In operation, the drying gas port 142 can receive a high volume, low pressure, high temperature gas (e.g., 21 cfm at less than 2 psig at 112° Celsius, 40 cfm at 10 psig at 120° Celsius, etc.). The aerosolizing gas port 146 can receive a low volume, high pressure, ambient temperature gas (e.g., 600 milliliters per minute (ml/min) at 90 psig at 23° Celsius, 400 ml/min at 100 psig at 21° Celsius, etc.). The high volume, low pressure, high temperature gas provided by the drying gas port 142 can remove moisture content from the liquid sample 108, for example at a flow rate of about 5-8 L/min. The low volume, high pressure, ambient temperature gas provided by the aerosolizing gas port 146 can aerosolize (e.g., suspension of the liquid droplets in the gas, formation of the dried particles with a humidified gas, etc.) the liquid sample 108.

In particular, the assembly 100" includes features that provide a self-contained sterile boundary to prevent contamination and in particular bacterial contamination of any of the liquid sample and dried particles obtained therefrom. According to general practices and guidelines, all equipment coming in contact with the blood or plasma must have been sterilized. Beneficially, the sterile boundaries described herein offer such assurances in a sterilized disposable set that is simple, cost effective and avoids the need for sterilization (e.g., autoclaving). In the illustrative embodiment, a first filter 270 is provided between the spray drying head 140 and the drying chamber 102". The first filter 270 provides a sterile boundary between the supply of drying gas (air) and the drying chamber 102", while allowing the drying gas to enter the chamber 102". A second filter 208 is provided between the nozzle 148 and the supply of aerosolizing gas. In the illustrative embodiment, the second filter is an inline filter provided along a section of tubing 208. The section of tubing 208 between the second filter 208 and the nozzle 148 is preferably sterilized, as are other components of the assembly 100", including the spray drying head 140, the drying chamber 102" and the collection sub assembly 104".

In at least some embodiments, the entire assembly 100" is provided as a sterile disposable unit. The assembly 100" can be manufactured and shipped in sterile condition using available medical packaging techniques known to those skilled in the art. The assembly 100" can be connected to sources of drying gas and aerosolizing gas, neither of which needs to be sterilized, providing a sterile boundary to prevent the transfer of bacteria into the drying chamber 102". A liquid suspension, such as a blood product can be connected to the liquid sample port 144 and dried through processes described herein. Dried powder can be separated from humid air within the sterile collection sub assembly 104". The separated dried powder can be sealed within the collection sub assembly 104", for example, by one or more thermal welds. Subsequently, the sealed collection sub assembly 104" containing the spray dried powder can be separated from other elements of the assembly 100", such as the drying chamber 102" and spray drying head 140 for transport and storage. The separated elements of the assembly 100" can be disposed of according to acceptable practices for disposing of such material as may be contaminated during processing.

Such provisions for maintaining sterility of the spray drying process and packaging of spray dried product are highly advantageous. The devices and techniques described herein, such as the example assembly 100", lessen restrictions on the spray drying process by defining a sterile boundary within a disposable assembly that can be used for sterile processing and packaging of the processed product, without imposing sterility requirements on other portions of a spray drying system external to the sterile boundary.

A schematic diagram of an embodiment of a spray drying system is illustrated in FIG. 4. The system 200 includes a spray drying assembly 100" (FIG. 3) and an aerosolizing gas source 202 in fluid communication with the aerosolizing gas input port 146 of the spray drying head assembly 140 through an aerosolizing gas conduit, e.g., tubing 204. In the illustrative embodiment, the aerosolizing gas source 202 comprises a pre-charged bottle of aerosolizing gas, such as nitrogen. A valve 206 and/or pressure regulator is positioned between the pre-charged bottle of gas 202 and the tubing 204 and configurable to otherwise control a flow of aerosolizing gas through the tubing 204. At least one inline filter 208 is provided along a length of the tubing 204, positioned between the gas source 202 and the aerosolizing gas input port 146. In at least some embodiments, the filter 208 is sufficient to effectively sterilize the aerosolizing gas, forming a sterile boundary for that portion of tubing between the filter 208 and the gas input port 146.

A liquid sample reservoir 210 containing a liquid sample 212 is in fluid communication with the liquid sample port 144 through a fluid line 214. In at least some embodiments, the fluid line 214 is sterilized. Fluid is transferred from sample reservoir 210 by one or more of gravity and a pump 216. In some embodiments the pump 216 is a peristaltic pump.

Drying air 110 is circulated through the drying chamber 102" in a closed loop fashion. Humid air is separated from spray dried powder within the collection sub assembly 104". The humid air exits through the exhaust port 116 and is transported to a dehumidifier 220 through a first gas conduit 218. The dehumidifier 220 removes moisture from the air and the moisture exits the dehumidifier 220 through an exhaust port 221. The dried air is transported to a blower unit 228 through a second gas conduit 226. The dried air is transported to a heater unit 224 via a third gas conduit 230. The dried air is heated to a predetermined temperature and transported to the drying gas port 142. Heated air is thus provided at a predetermined pressure, controllable at least in part by operation of the blower unit 228, to the spray drying chamber 102". The dried heated air 110 is passed through a drying gas filter 270. In at least some embodiments the drying gas filter 270 is sufficient to sterilize the dried heated air 110 (e.g., using a bacteria filter) providing a sterile boundary at an input to the spray drying chamber 100".

The heated drying air 110 interacts with the aerosolized liquid sample 108 within the length of the drying chamber 102" to produce a dried powder and humid air at an exhaust end of the drying chamber 102". The mixture of dried powder in the humid air is exhausted into the collection sub assembly 104". The filter 118 allows humid air to pass through while otherwise preventing passage of the dried powder 119. Accordingly, the dried powder 119 accumulates within the collection chamber 120. The humid air is exhausted and recycled within the system repeatedly, after drying and reheating as described above.

In at least some embodiments the system 200 includes a controller 240, such as a processor. The controller 240 is in communication with one or more of the aerosolizing gas pressure regulator 206, the fluid pump 216, the dehumidifier 220, the heater 224 and blower unit 228. Such communication can be accomplished through one or more communication links 242a, 242b, 242c, 242d, 242e (generally 242). These links 242 can be wired or wireless. The controller 240 can be configured to instruct the one or more devices 202, 216, 220, 224, 228 under its control as may be necessary to control the spray drying process. Alternatively or in addition, the controller 240 can be configured to receive feedback from one or more of the devices 202, 216, 220, 224, 228, as may be advantageous to control the spray drying process.

In at least some embodiments one or more sensors are provided at strategic locations throughout the system. For example, temperature sensors such as thermocouples 266a, 266b (generally 266) can be provided at the drying gas input port 142 and at the outlet port 116 of the collection sub assembly. Other sensors may include flow meters, pressure sensors, and/or light sensors. Such sensors can be in communication with the controller 240, for example by way of a communication link or conductive lead 267, providing feedback usable by the processor to control or otherwise improve the spray drying process.

In at least some embodiments, the sample reservoir 210 is configured to provide a standard unit of a blood product, such as a typical blood supply bag accommodating one unit of whole blood, which is approximately 450 ml, or about 0.951 pints. In some embodiments, the reservoir 210 can include one or more other liquid blood products, such as plasma, the fluid portion of one unit of human blood that has been centrifuged and separated. For such embodiments configured for single unit processing, the collection sub assembly 104" is also sized to accommodate the resulting spray dried product obtained from processing the single unit of blood product. As the liquid portion of the blood product has been removed by the spray drying process, a storage volume of the collection sub assembly 104" can be smaller than the volume of the sample reservoir 210. In at least some embodiments, however, the storage volume of the collection sub assembly 104" can be as large as or even larger than the volume of the sample reservoir 210. For example, the storage volume of the collection sub assembly 104" can include sufficient volume to accommodate later rehydration of the spray dried blood product as described in more detail below.

When used for single unit processing, the entire disposable assembly 100" is preferably replaced after processing a single unit of blood product. This practice maintains sterility and prevents cross contamination as might otherwise occur if the same disposable assembly 100" were to be used for processing multiple sample units of blood product. After processing, the collection sub assembly 104" can be removed from the system 200 and separated from other portions of the disposable assembly 100", such as the drying chamber 102". The spray dried blood product thus obtained can be safely stored within the collection sub assembly 104" for much longer duration than otherwise would be possible. The remaining portions of the disposable assembly 100" can then be disposed of.

Alternatively or in addition, the sample reservoir 210 can be configured to provide more than a standard unit of blood product. Such larger units are typically the result of pooling together multiple units of blood product. Such pooling can be accomplished, for example, by providing a single larger sample reservoir 210. For example, in a pooling scenario of 10 units of blood product (e.g., 450 ml each), the single pooled reservoir 210 would provide sufficient volume to accommodate at least about 4.5 L of blood product. It is also understood that in some embodiments, pooling can be accomplished by otherwise combining multiple standard units of blood product prior to injection into the drying chamber 102". For example, such pooling can be accomplished by including multiple sample reservoirs 210 in a parallel arrangement, with tubing segments from each of the individual sample reservoirs 210 combined (e.g., a manifold) prior to reaching the peristaltic pump 216. In this manner, the single pump 216 can pump the contents of all of the multiple parallel sample reservoirs 210 in a controlled flow suitable for spray drying processing. In yet another scenario, pooling can be accomplished in a serial process, in which single unit reservoirs 210 are sequentially coupled to the pump 216, their contents spray dried and collected in a single collection sub assembly 104" as described herein.

In order to accommodate a larger volume of spray dried blood product, the collection sub assembly 104" can be larger. For example, a collection sub assembly 104" configured to accommodate the 10 unit pooling example, whether obtained by a parallel or serial, sequential arrangement, can be sized approximately 10 times larger than would otherwise be preferable for processing of a single unite. It is worth noting here that the spray drying process is a continuous flow process. As such, there are no particular size constraints imposed on other portions of the system 200, such as the drying chamber 102". Thus, whether the system 200 is configured to process single units or pooled units, a drying chamber 102" of a common size and shape can be used to accommodate both.

Figure 5A:
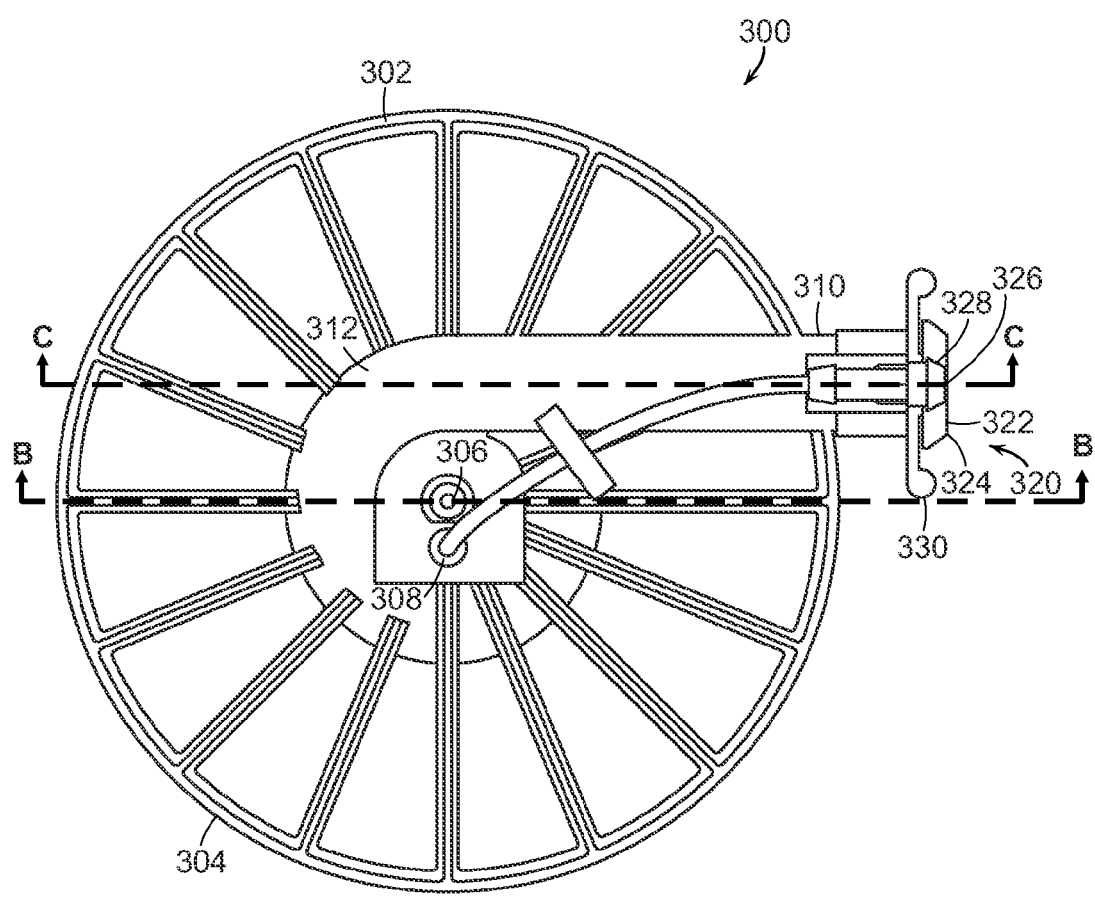
FIG. 5A illustrates a top view of embodiment of a spray drying head assembly.

A top view of an embodiment of a spray drying head assembly is illustrated in FIG. 5A. The spray drying head 300 includes a drying chamber cover 302 in outer perimeter 304. In the illustrative embodiment the outer perimeter 304 is circular. The center region of the drying chamber cover 302 includes a sterile liquid sample port 306 and a sterile aerosolizing gas port 308. A drying gas conduit 310 extends between an attachment fixture 320 and a drying gas manifold 312. In the illustrative embodiment the drying gas manifold 312 is helical extending around the central region of the drying chamber cover 302. The helically, centralized drying gas manifold 312 enables the drying gas to be gradually released into drying chamber as the drying gas moves around the circular drying gas manifold 312 while still maintaining a sufficient positive pressure with respect to the drying chamber. The attachment fixture 320 includes a drying gas port 322 and an aerosolizing gas port 326. The drying gas port 322 is circular including a peripheral sealing surface 324 adapted for mating with a complementary sealing surface. Likewise, the aerosolizing gas port 326 is circular also including a peripheral sealing surface 328. An attachment flange 330 extends along either side of the center line of the drying gas conduit 310.

Figure 5B:
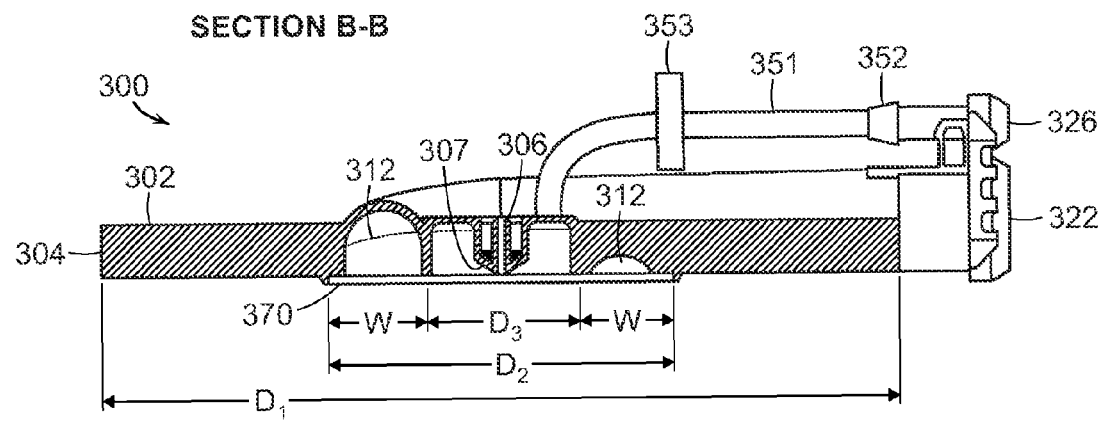
FIG. 5B and FIG. 5C illustrates different cross-sections of the spray drying head assembly shown in FIG. 5A.

Illustrated in FIG. 5B, is a first cross-section B-B of the spray drying head assembly 300 shown in FIG. 5A. The cross-section B-B reveals helical nature of the drying gas manifold 312. Drying gas enters from the conduit 310 and spirals around the central region. The height of the manifold 312 decreases as the volume of drying gas decreases, maintaining a substantially constant pressure within the manifold 312. A volume of the drying gas decreases as the gas, exposed to the filter in the manifold 312, passes through a drying gas filter 370.

Figure 5C:
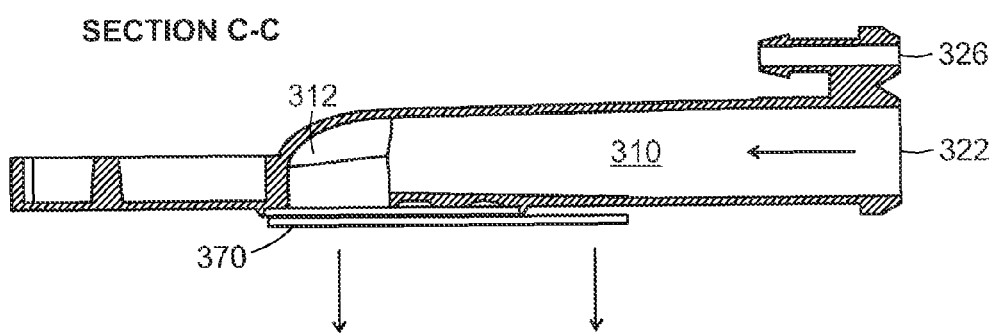

A second cross-section of the spray drying head assembly shown in FIG. 5A, is illustrated in FIG. 5C, taken along a plane bisecting the drying air conduit 310 and including the aerosolizing gas input port 326. Drying gas received from a drying gas source through the drying gas port 322, passes through the conduit 310 as indicated by the arrow and into the manifold 312. The manifold 312 allows the drying gas to spread throughout an open volume adjacent to the drying gas filter 370. Pressure provided by an applied flow of drying gas forces drying gas from the manifold 312 through the drying gas filter 370 as indicated by the vertical arrows. There is no particular requirement that either the drying gas source (not shown), or the drying gas port 322, conduit 310 or manifold 312 be sterile. The drying gas filter 370 can be a sterilizing filter (e.g., bacteria filter) provided between the manifold 312 and an interior volume of a spray drying chamber adjacent to the filter 370. Such a sterilizing drying gas filter 370 creates a sterile boundary for the drying gas, such that drying gas having passed through the filter 370 is sterile as it passes into the spray drying chamber.

Referring again to FIG. 5B, a diameter of the drying chamber cover 302 measured from diametrically opposing portions of outer peripheral attachment surface 340 is $D_1$. A diameter of that portion of the manifold 312 open to the drying gas filter 370 is $D_2$. Also shown in cross-section is a portion of an inner nozzle 307, including a central bore 306. The width of the nozzle region is $D_3$, such that the region exposed to an annular filter (e.g., filter 270, FIG. 4) is radially measured from $D_3/2$ to $D_2/2$ (an annular width, W).

Illustrated in the cross section is an aerosolizing gas conduit 351 extending between an aerosolizing gas fitting 352 and the sterile aerosolizing gas port 308. In at least some embodiments, the aerosolizing gas fitting 352 can be an integral feature of the attachment fixture 320, as shown. Aerosolizing gas received from a gas source through the aerosolizing gas port 326, passes through an internal lumen of the attachment fixture 320, exiting at the aerosolizing gas fitting 352. There is no particular requirement that either the aerosolizing gas source, or the aerosolizing gas fitting 352 be sterile. The aerosolizing gas conduit 351 includes a sterilizing filter 353 (e.g., bacteria filter) provided between the aerosolizing gas fitting 352 and the sterile aerosolizing gas port 308. The sterilizing filter creates a sterile boundary for the aerosolizing gas, such that aerosolizing gas having passed through the filter 353 is sterile as it passes through the aerosolizing gas port 308.

Figure 6B:
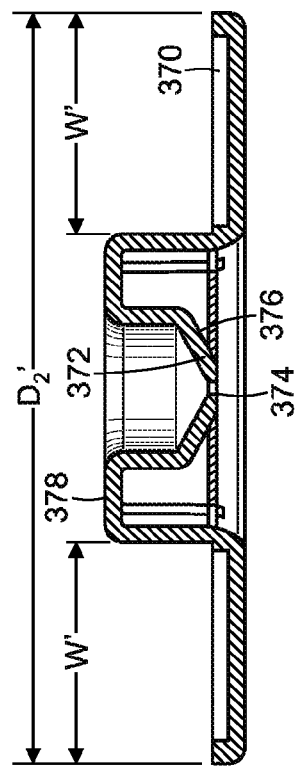
FIG. 6B illustrates a cross-section of the drying air filter frame shown in FIG. 6A.
Figure 6A:
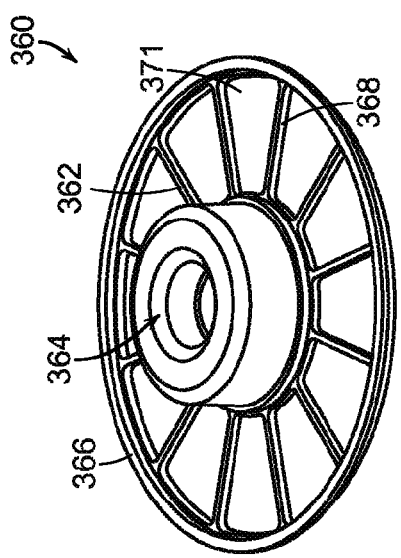
FIG. 6A illustrates a top perspective view of an embodiment of a drying air filter frame.

A top perspective view of an embodiment of a drying air filter frame assembly 360 is illustrated in FIG. 6A. The filter frame assembly 360 includes an annular filter support frame 362, defined between a central hub 364 and an outer circumferential rim 366. The filter support frame 362 includes multiple ribs or spokes 368, extending radially between the central hub 364 and the outer rim 366. Open areas 371 are defined between adjacent spokes 368, an outer perimeter of the central hub 364 and the rim 366. The filter support frame 362 provides substantial support to an annular drying gas filter 370 (FIG. 6B), for example, holding the drying gas filter 370 in place under anticipated pressures during spray drying operation. Preferably, the filter support frame 362 provides such support, while minimally impeding or otherwise blocking the filter surface. In the illustrative example, it can be seen that the area 371 defined between spokes 368 is substantially greater than the area otherwise blocked by the spokes 368.

A cross-section of the drying air filter frame assembly 360 including the annular drying gas filter 370 is illustrated in FIG. 6B. Dimensionally, the diameter of the outer rim is represented by $D_2'$, whereas, the radial extent of the annular region between the central hub 364 and the rim is represented by W'. An example of an annular filter is shown positioned against the spokes.

Figure 6C:
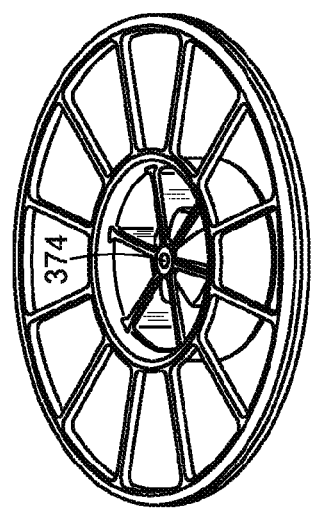
FIG. 6C illustrates a bottom perspective view of the drying air filter frame shown in FIG. 6A.

The central hub includes a raised cylindrical section 378, extending for a height above a plane containing the spokes. The raised cylindrical section 378 includes an annular, topfacing abutting surface, extending radially inward. A central cavity 372 is defined along an inner extent of the abutting surface. The central cavity extends axially, toward the plane containing the spokes. A bottom end of the central cavity terminates in a conical surface 376, defining a central orifice 374. A bottom perspective view of the drying air filter frame assembly is illustrated in FIG. 6C. The central orifice is shown in central alignment with a central axis.

Figure 7:
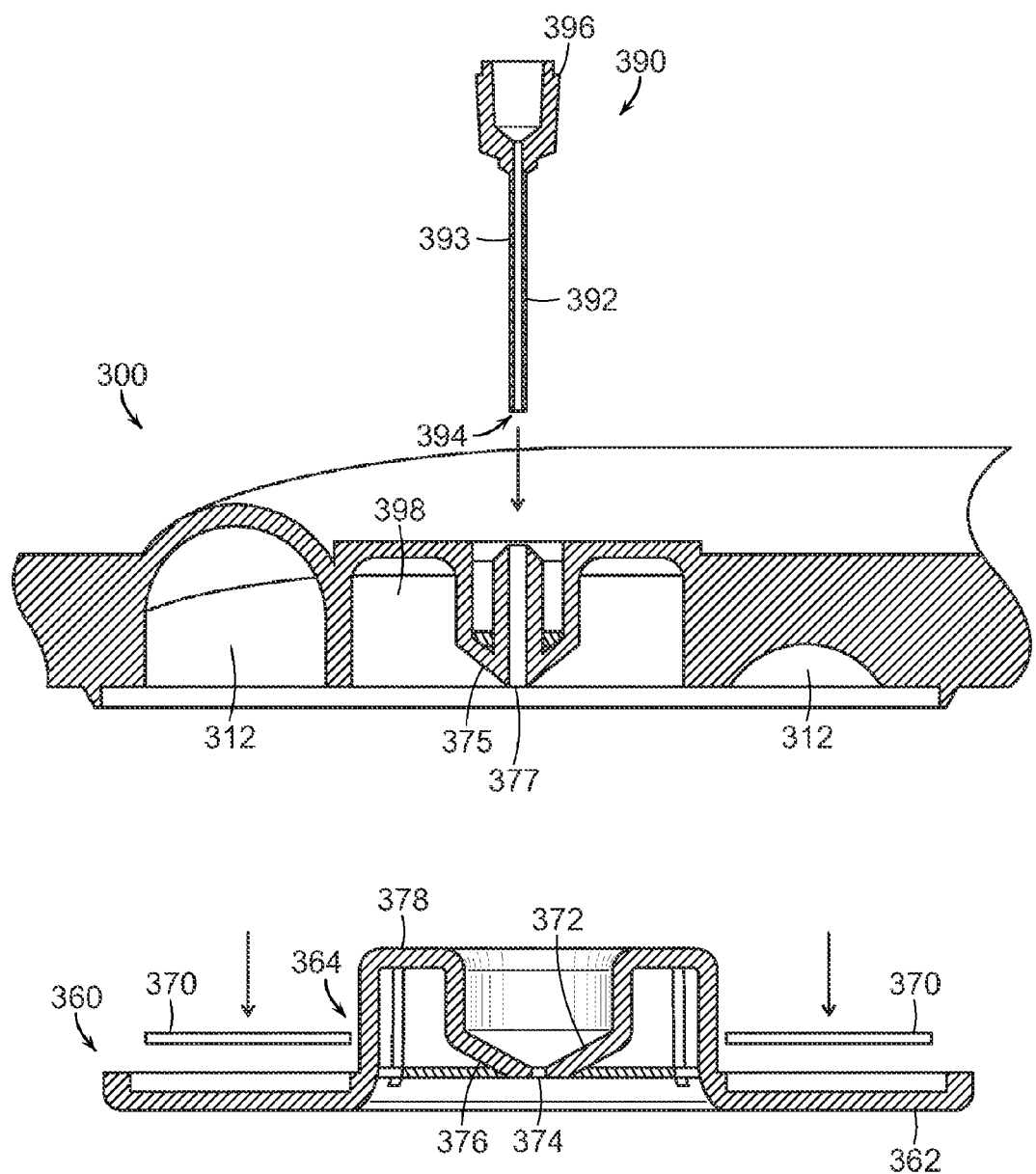
FIG. 7 illustrates a partial, exploded cross-sectional view of another embodiment of a spray drying head assembly, including the spray drying head shown in FIG. 5A through FIG. 5C and the filter frame assembly 360 shown in FIG. 6A through FIG. 6C.

A partial, exploded cross-sectional view is illustrated in FIG. 7 of another embodiment of a spray drying head assembly, including the spray drying head assembly 300 illustrated in FIG. 5A through FIG. 5C and the filter frame assembly 360 illustrated in FIG. 6A through FIG. 6C. Also shown in cross section is the drying gas filter 370. The spray drying head assembly 300 defines an aerosolizing gas manifold 398 open to a bottom side of the assembly 300. The aerosolizing gas manifold 398 includes an annular recess inscribed within the helix of the drying gas manifold 312. The two manifolds 312, 398 are separated by a wall to allow each to operate at independent pressures without interfering with the other (e.g., the manifold 312 operating at high pressure and the manifold 398 operating at low pressure, the manifold 312 operating at high pressure and the manifold 398 operating at low pressure).

A nozzle 375 extends into a central region of the aerosolizing gas manifold 398. The nozzle 375 includes a central bore 377 extending through the nozzle 375 and open at both ends, forming a channel penetrating the spray drying head assembly 300 from top to bottom. In assembly, the filter frame assembly 360 is centrally aligned with the spray drying head assembly 300 along a central axis containing the central bore 377 and a centerline of the nozzle cap 376. The nozzle cap includes an orifice 374 that is also aligned with the central bore 377 of the nozzle 375.

When assembled, the abutting surface 378 of the filter frame assembly 360 extends into the aerosolizing gas manifold 398 of the spray drying head assembly. A drying air filter (e.g., filter 270, FIG. 4) is held into place, firmly against a bottom surface of the spray drying head assembly 300, such that the open areas 371 between spokes 368 align with an at least partially annular opening to the drying air conduit 312, allowing drying air forced through the conduit 312 to exit the spray drying head assembly 300 through the drying air filter 270.

When assembled, a generally narrow opening remains between an outer surface of the nozzle 375 and the open cavity 372 of the central hub 364. The narrow opening allows aerosolizing gas to pressurize the narrow area, exiting the spray drying head assembly 300 through the nozzle cap orifice 374. In at least some embodiments the nozzle cap orifice 374 can be partially blocked by a distal tip of the nozzle 375, presenting an annular opening for exit of the aerosolizing gas.

The example embodiment also includes a Luer fitting cannula 390 for conveying a liquid sample through the spray drying head assembly 300. The Luer fitting cannula 390 includes a precision fluid channel 392 provided by a cannula 393 defining a central bore. The central bore 392 extends from the Luer fitting 396 at one end, to a fluid channel orifice 394 at an opposite end. In the example embodiment, the central bore 377 of the nozzle 375 is suitably dimensioned to accept the cannula 393, forming a fluid-tight seal therebetween.

Figure 8A:
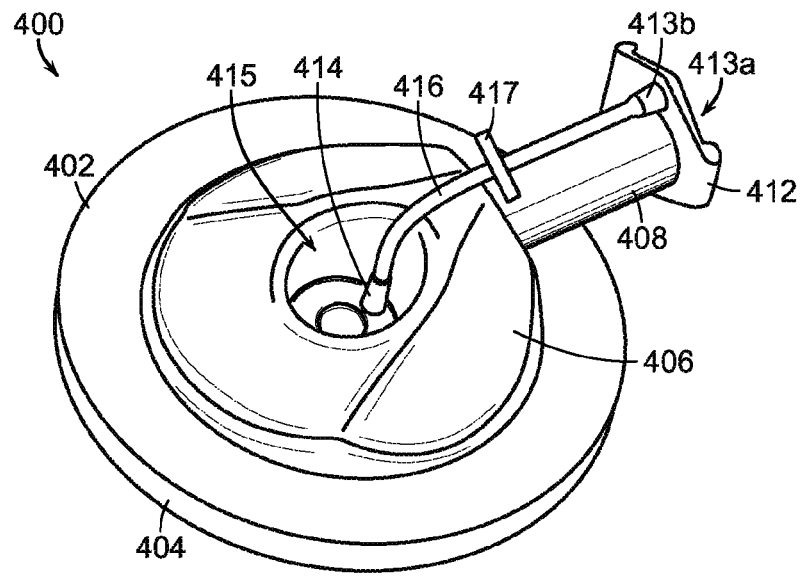
FIG. 8A illustrates a top perspective view of another embodiment of a cover portion of a spray drying head assembly.

A top perspective view of another embodiment of a cover portion of a spray drying head assembly is illustrated in FIG. 8A. The spray drying head 400 includes a drying chamber cover 402 defining an outer perimeter 404. In the illustrative embodiment the outer perimeter 404 is circular. The center region of the drying chamber cover 402 includes a sterile aerosolizing gas nipple 414. A drying gas conduit 408 extends between an attachment fixture 412 and a drying gas manifold 406. In the illustrative embodiment the drying gas manifold 406 is annular extending around a depression 415 of the drying chamber cover 402. The attachment fixture 412 includes a drying gas port 413a and an aerosolizing gas port 413b. An aerosolizing gas conduit 416 extends between the aerosolizing gas port 413b and aerosolizing gas nipple 414. In at least some embodiments, the aerosolizing gas port 413b can be an integral feature of the attachment fixture 412, as shown. Aerosolizing gas received from a gas source through the aerosolizing gas port 413b, passes through an internal lumen of the attachment fixture 412, exiting into the aerosolizing gas conduit 416 The aerosolizing gas conduit 416 includes a sterilizing filter 417 (e.g., bacteria filter) provided between the aerosolizing gas port 413b and the aerosolizing gas nipple 414. The sterilizing filter 417 creates a sterile boundary for the aerosolizing gas, such that aerosolizing gas having passed through the filter 417 is sterile as it passes through the aerosolizing gas nipple 414.

Figure 8B:
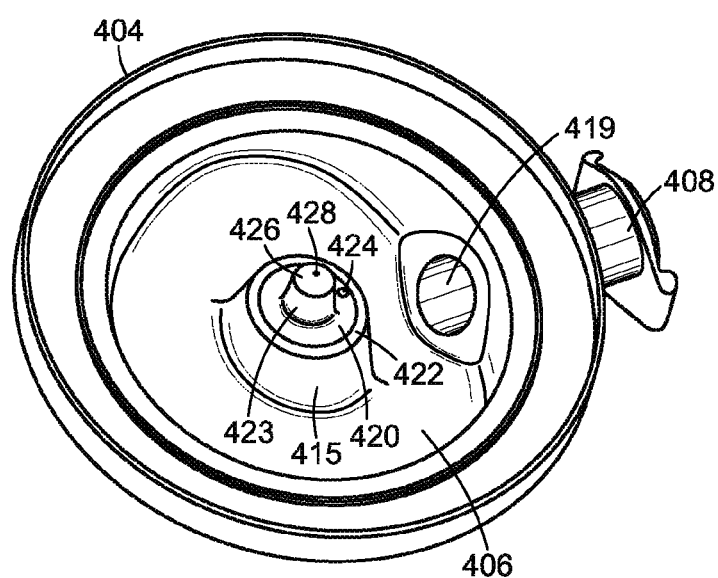
FIG. 8B illustrates a bottom perspective view of the cover portion shown in FIG. 8A.

A bottom perspective view of the cover portion 402 shown in FIG. 8A, is illustrated in FIG. 8B. An underside of the central depression 415 extends into a central region of the drying air manifold 406, such that an annular opening is formed between the central depression 415 and an outer peripheral portion of an underside of the cover 402. A drying gas inlet port 419 opens from the drying air conduit to the drying air manifold 406 allowing for the passage of drying air from an external source to the manifold 406.

Extending further from a central region of the central depression is an inner, nozzle 426. The nozzle 426 includes a sidewall, or collar 423 and a fluid channel aperture 428. Formed along a base portion of the collar 423 is a shoulder region of the central depression 415. The shoulder region includes an outer, circumferential ridge 422 extending above an annular well 420. An aerosolizing gas port 424 penetrates the annular well 420, allowing for the passage of aerosolizing gas through the nipple 414 to penetrate the cover 402.

Figure 9A:
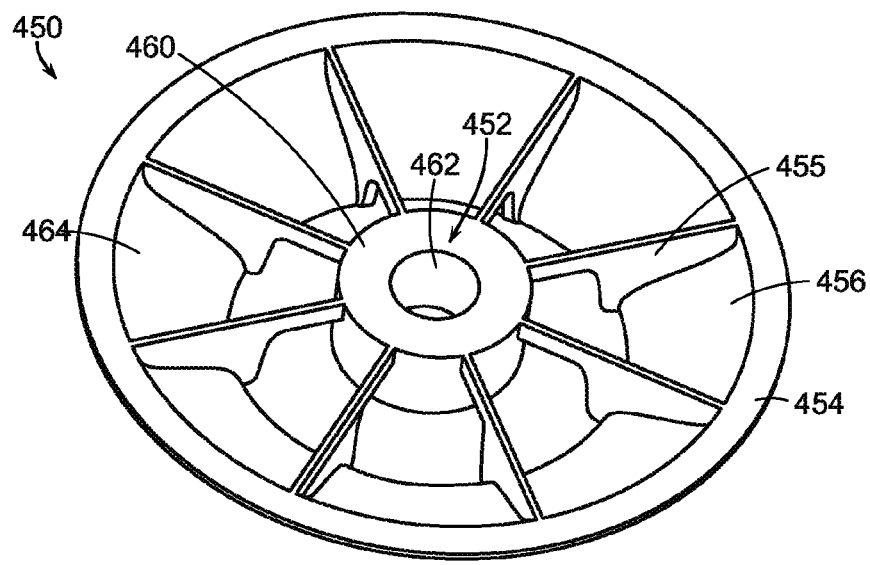
FIG. 9A illustrates a top perspective view of another embodiment of a drying air filter frame.

A top perspective view of another embodiment of a drying air filter frame assembly 450 is illustrated in FIG. 9A. The filter frame assembly 450 includes an annular filter support frame, defined between a central hub 452 and an outer circumferential outer rim 454. The filter support frame includes multiple ribs or spokes 455 extending radially between the central hub 452 and the outer rim 454. Open areas 456 are defined between adjacent spokes 454, an outer perimeter of the central hub 452 and the rim 454. The filter support frame provides substantial support to an annular filter (not shown), for example, holding the filter in place under anticipated pressures during spray drying operation. Preferably, the filter support frame provides such support, while minimally impeding or otherwise blocking the filter surface. In the illustrative example, it can be seen that the area 456 defined between spokes 455 is substantially greater than the area otherwise blocked by the spokes 455.

Figure 9B:
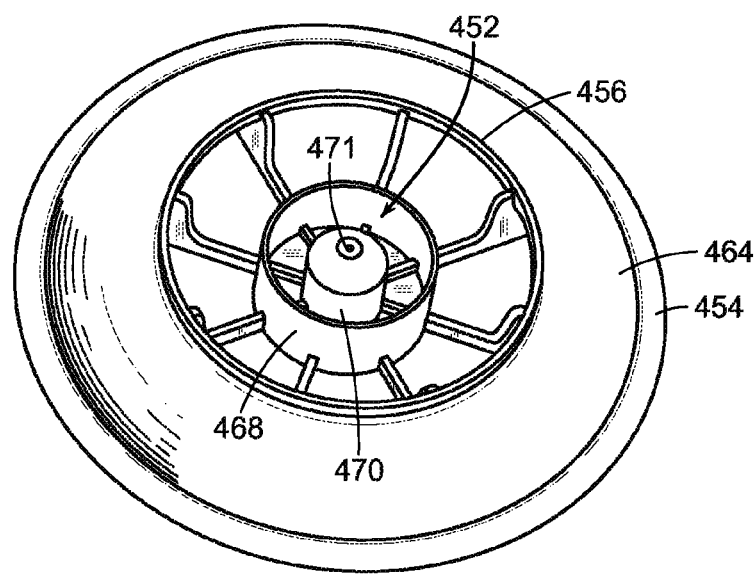
FIG. 9B illustrates a bottom perspective view of the drying air filter frame shown in FIG. 9A.

An annular abutting surface 460 of the hub 452 is substantially aligned in a common plane with at least one of the spokes 455 and the outer rim 454, although it is understood that one or more may be offset by a slight measure, for example, a filter thickness. Also defined within a central region of the hub 452 is an open cavity 462. The cavity 462 extends away from the alignment plane, in a direction toward filtered drying air flow (unfiltered drying air enters from above the top portion). As can be seen in FIG. 9B, the depression 462 defines a nozzle cap 470, defining a central orifice 471. The central hub 452 also includes a cylindrical shroud 468 extending away from the abutting surface 460, in a direction of filtered drying air flow.

An annular wall section 464 extends between the outer rim 454 and an inner rim 456. The inner rim 456 is diametrically smaller than the outer rim 454. Additionally, the inner rim 456 resides in a plane parallel to the alignment plane above, but offset in a dimension extending in the direction of filtered drying air flow. In the illustrative example, an open end of the cylindrical shroud 468 and the inner rim 456 reside substantially within a common plane. In operation, forced drying air passes through a relatively larger filter area defined between the outer rim 454 and the central hub 452, into a plenum formed by the annular wall section 464, and exiting the filter frame assembly 450 through a reduced open area defined between the inner rim and a centrally disposed cylindrical shroud 468. The reduction in cross-sectional area presented to the heated drying air results in an increase in velocity.

Figure 10A:
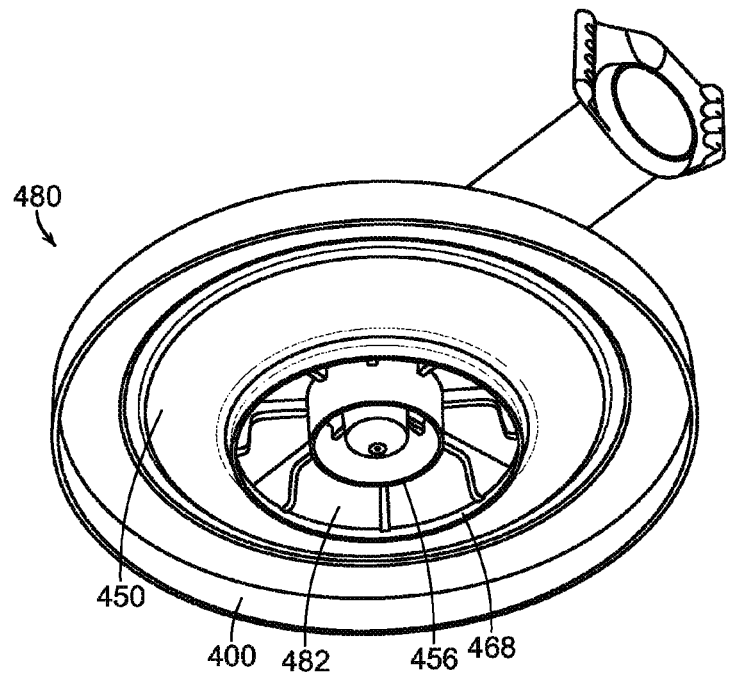
FIG. 10A illustrates a bottom perspective view of an assembled spray drying head assembly.

A bottom perspective view of an assembled spray drying head assembly 480 is illustrated in FIG. 10A. An example annular disk filter 482 is visible viewed from an underside of the assembly, between an opening formed between the inner rim 456 and the cylindrical shroud 468.

Figure 10B:
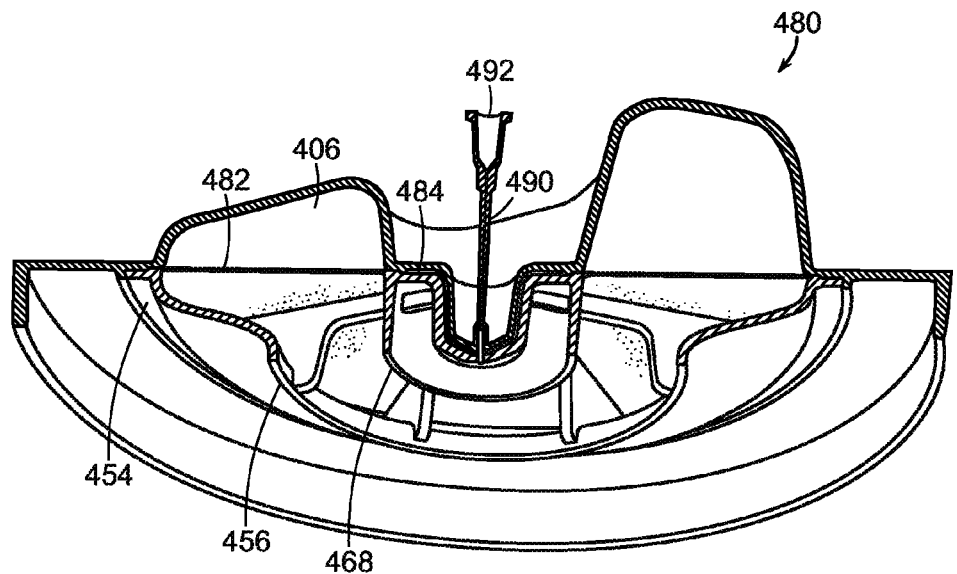
FIG. 10B illustrates a bottom perspective cross-sectional view of the spray drying head assembly shown in FIG. 10A.

A bottom perspective cross-sectional view of the spray drying head assembly shown in FIG. 10A, is illustrated in FIG. 10B. An aerosolizing gas manifold 484 is formed between the abutting surface 460 of the hub 452 and the annular well 420. The outer, circumferential ridge 422 provides a stop to the abutting surface 460, allowing for a measured open area to accommodate the aerosolizing gas flow. The assembly 480 also includes a precision fluid channel 490 for transporting fluid through the spray drying head assembly 400 and into the spray drying chamber. In at least some embodiments, the precision fluid channel 490 can be provided by a commodity cannula terminating in a standard fluid fitting 492, such as a Luer lock.

Figure 11:
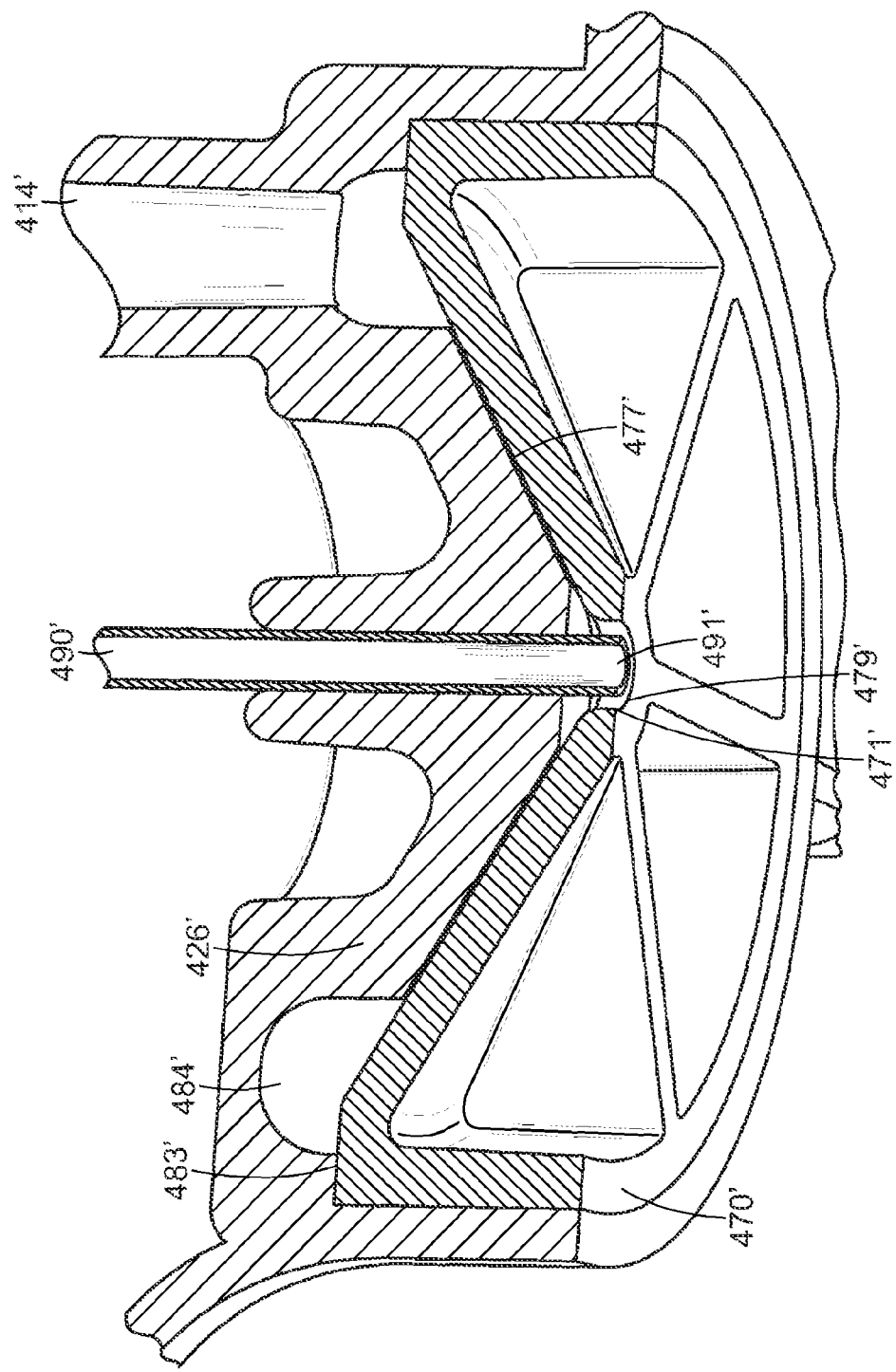
FIG. 11 illustrates a cross-sectional view of a nozzle portion of another embodiment of a spray drying head assembly.

A cross-sectional view of a nozzle portion of another embodiment of a spray drying head assembly is illustrated in FIG. 11. An inner nozzle 426' is disposed adjacent to a nozzle cap 470'. The cannula 490' defines a precision fluid channel, terminating in a precision fluid channel orifice 491'. The cannula 490' extends through a central bore of the nozzle 426', such that a tip of the cannula 490' extends for a relatively short distance beyond a termination of a central bore. The central bore is aligned with central orifice 471' of the nozzle cap 470', such that the extending portion of the cannula 490' extends at least into the aperture 471'. In at least some embodiments, an annular opening 479' is defined between an outer peripheral edge of the extending portion of the cannula 490' and the nozzle cap orifice 471'.

Aerosolizing gas enters through an aerosolizing gas inlet port 414' and circulates within an aerosolizing gas manifold 484'. The manifold 484' is adjacent to an exposed narrow region 477' defined between opposing surfaces of the nozzle 426' and the nozzle cap 470', such that pressurized aerosolizing gas is forced through the narrow region 477', exiting the assembly through the annular opening 479'. The relative spacing defining the narrow region 477' can be controlled according to an interface of an abutting surface 483' of the nozzle cap 470' and an opposing surface of the nozzle 426'.

Advantageously, the exiting air aerosolizes fluid exiting the precision fluid channel orifice 491'. Relative flow rates of the liquid sample as controlled by one or more of a sample fluid pump rate and diameter of the precision fluid cannula 490', in combination with one or more of aerosolizing gas pressure (flow rate), the dimensions of the narrow region 477' and the annular orifice 479' interact to create and maintain an aerosolized plume of the sample fluid extending away from the precision fluid channel orifice 491'.

Figure 12:
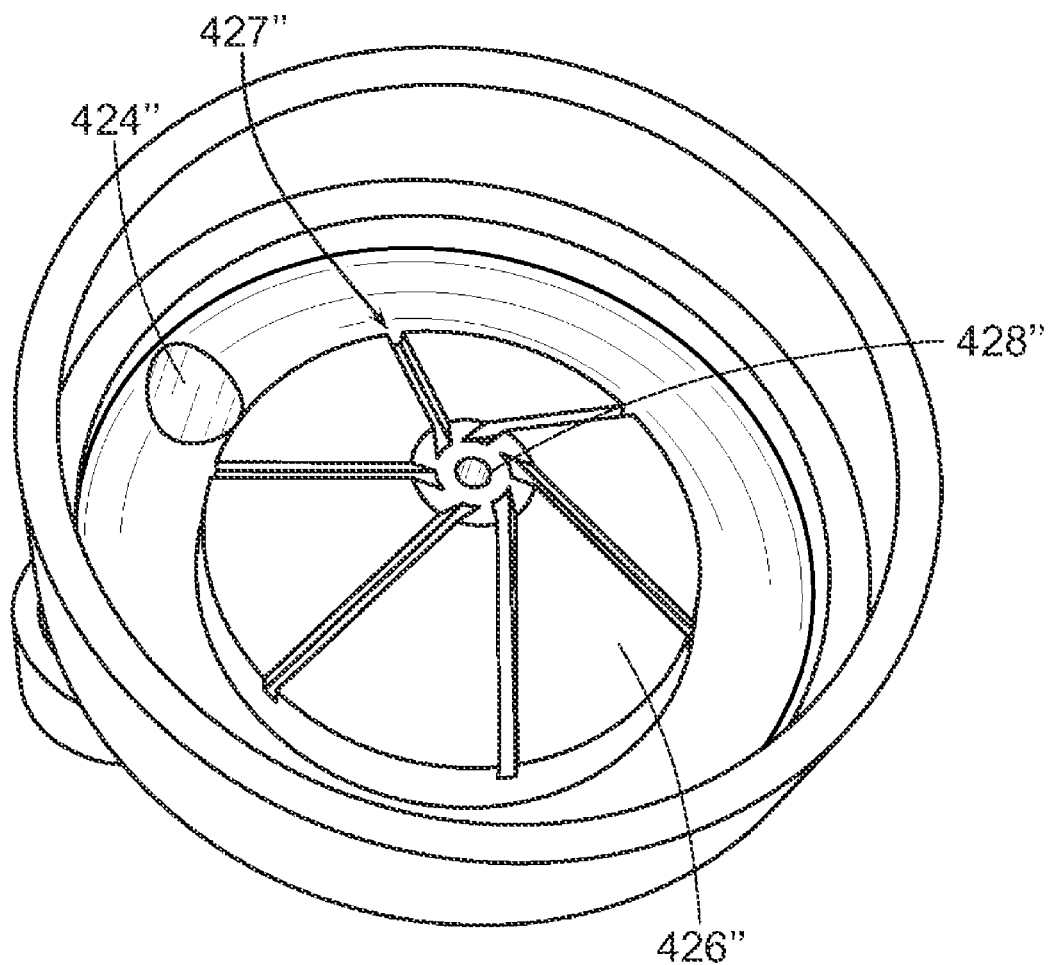
FIG. 12 illustrates a bottom view of a nozzle portion of the nozzle portion illustrated in FIG. 11.

A bottom view of a nozzle portion of the nozzle portion illustrated in FIG. 11, is illustrated in FIG. 12. A surface of the nozzle 428" exposed to the aerosolizing gas injected at the aerosolizing gas port 424" includes one or more surface features adapted to induce a preferential movement of the aerosolizing gas. For example, the one or more such features can include ridges 426" or troughs 427", as shown. The ridges 426" or troughs 427" can be arranged in a spiral orientation to induce a turbulence for aerosolizing gas passing by. The turbulence, in turn, can be used to establish a relatively circular air flow about the nozzle 428". In some embodiments, no such surface features are necessary.

Figure 13:
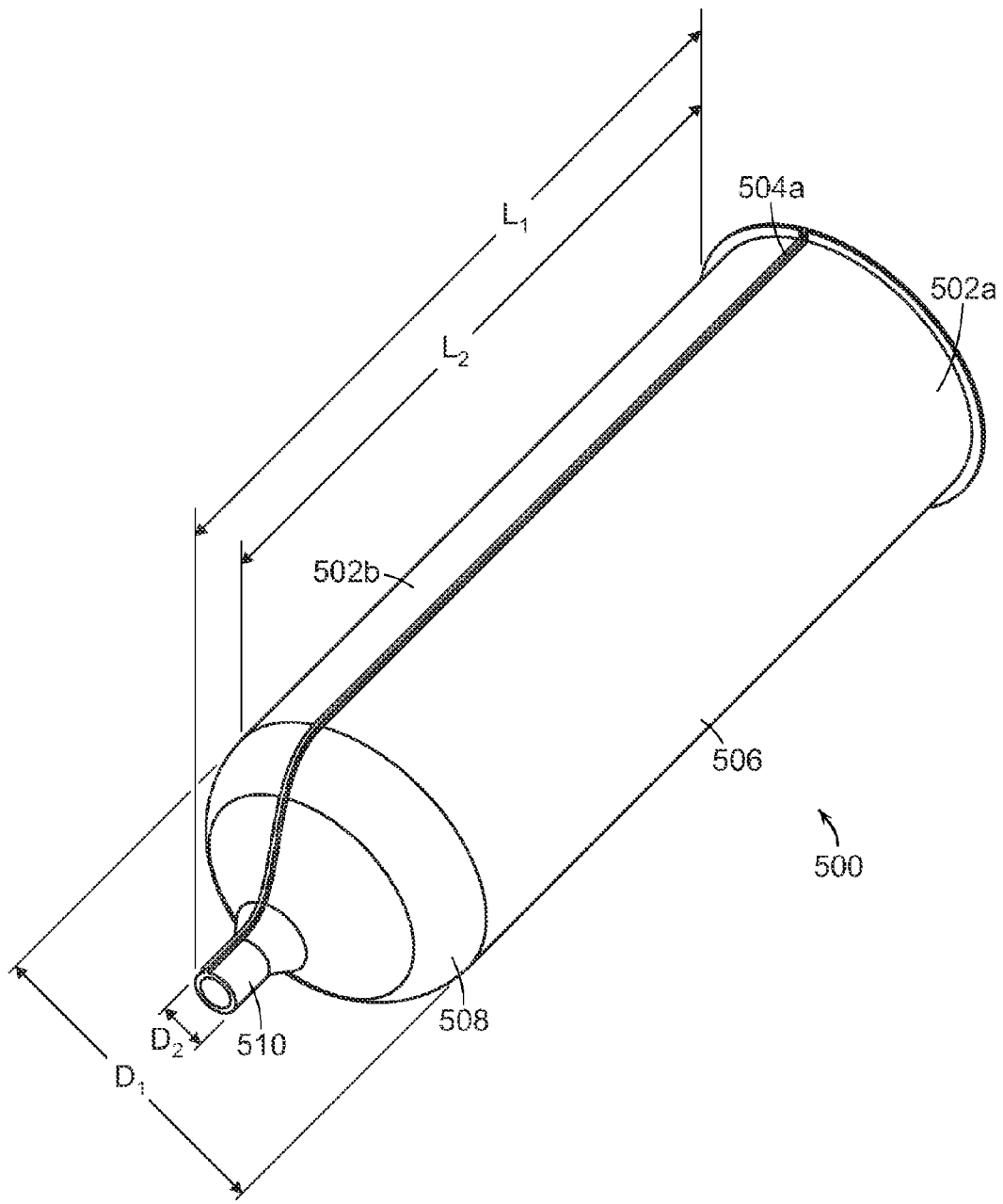
FIG. 13 illustrates a perspective view of an embodiment of a spray drying chamber.

A perspective view of an embodiment of a spray drying chamber 500 is illustrated in FIG. 13. The spray drying chamber 500 defines an elongated drying volume, extending along a central longitudinal axis. In the exemplary embodiment, the drying chamber 500 includes a first columnar wall section 506 having a relatively wide opening at one end. An opposite end of the columnar walls section 506 couples to a narrow columnar section 510 through a shoulder wall section 508. The narrow columnar section 510 has a relatively narrow opening disposed at an end opposite the relative wide opening, the two openings being aligned along the central axis. For illustration purposes, a diameter of the first columnar section is shown as $D_1$ (e.g., 8 inches, 5 inches, etc.) and a diameter of the narrow columnar section 510 is shown as $D_2$ (e.g., 1 inch, 2 inches), with $D_2 < D_1$. An axial length of the drying chamber 500 is shown as $L_1$ (e.g., 12 inches long, 20 inches long, etc.). An axial length of the first columnar wall section 506 is shown as $L_2$ (e.g., 14 inches, 22 inches, etc.). In the illustrative embodiment, the length of the shoulder wall section 508 and narrow wall section 510 (i.e., $L_1 - L_2$) is substantially less than the length of the columnar wall section 506. Thus, most of the interior region of the drying chamber 500 is available for interaction of an aerosolized plume of sample liquid with heated drying gas.

In operation, a plume of aerosolized sample liquid is introduced into the relatively wide open end. Heated drying air is also introduced into the relatively wide open end, such that the heated drying air comes into extended contact with the plume of aerosolized sample liquid. As a consequence of such interaction, moisture is removed from the plume of aerosolized sample liquid, while velocities of one or both of the aerosolized sample liquid and heated drying gas moves humid drying air and dried powder toward the relatively narrow column section 510. A constriction resulting from the shoulder section 508 can maintain a desired amount of back pressure within the drying chamber 500.

The drying chamber 500 can be configured as shown, such that a flow of aerosolized liquid and drying air entering the chamber 500 is directed along a longitudinal axis. Likewise, channeling of dried powder and humid air exiting the chamber 500 is also directed along the same longitudinal axis. Maintaining such a linear flow without any bends, prevents unwanted collection of dried powder as might otherwise occur. Preferably all of the spray dried powder is transported from the chamber 500 to a separation and collection device. In at least some embodiments further prevention of unwanted collection of dried powder can be achieved by arranging the longitudinal axis vertically. The aerosolized liquid sample and drying air enter the drying chamber 500 from an upper portion and separation and collection occurs at a lower portion. In such configurations, gravity promotes the transfer of spray dried powder downward, along the longitudinal axis and towards the separation and collection chamber.

One or more of the drying chamber components, including the columnar wall section 506, the shoulder wall section 508 and the relatively narrow wall section 510 can be constructed from a rigid material, such as glasses, ceramics, metals, including alloys (e.g., stainless steel), and plastics. Alternatively or in addition, one or more of the components of the drying chamber can be semi-rigid, for example, being fashioned from a semi-rigid plastic. Such components can be fabricated in such a manner to allow for collapse of at least a portion of the drying chamber 500. For example, at least a portion of at least the columnar wall section 506 can be fabricated as a circumferential accordion arrangement to allow for selective collapse, reducing overall length $L_1$, substantially, as may be advantageous for packaging and storage.

Alternatively or in addition, one or more of the components of the drying chamber can be at least one of flexible, pliable, bendable, collapsible, and floppy. In such applications, the wall sections are prepared as relatively thin members. For example, one or more of the components can be fabricated from the same or similar material as commonly used in blood storage bags, such as a polyvinyl chloride (PVC) film. In at least some embodiments, one or more elements of the drying chamber 500 are translucent or transparent, allowing for visual inspection or machine interrogation (e.g., optical interrogation) as to the status of the process.

The entire drying chamber 500 can be fabricated as a single unit, for example, being molded, extruded or otherwise shaped as described above, without seams. Alternatively, one or more sections of the drying chamber 500 can be fabricated as different pieces, joinable along seams. One such example includes a first and second wall columnar wall sections 502a, 502b, cut to a suitable pattern and joined along common seams 504a. Such joining can be accomplished by one or more of mechanical attachment (e.g., clamps or fasteners), welding and bonding.

Figure 14A:
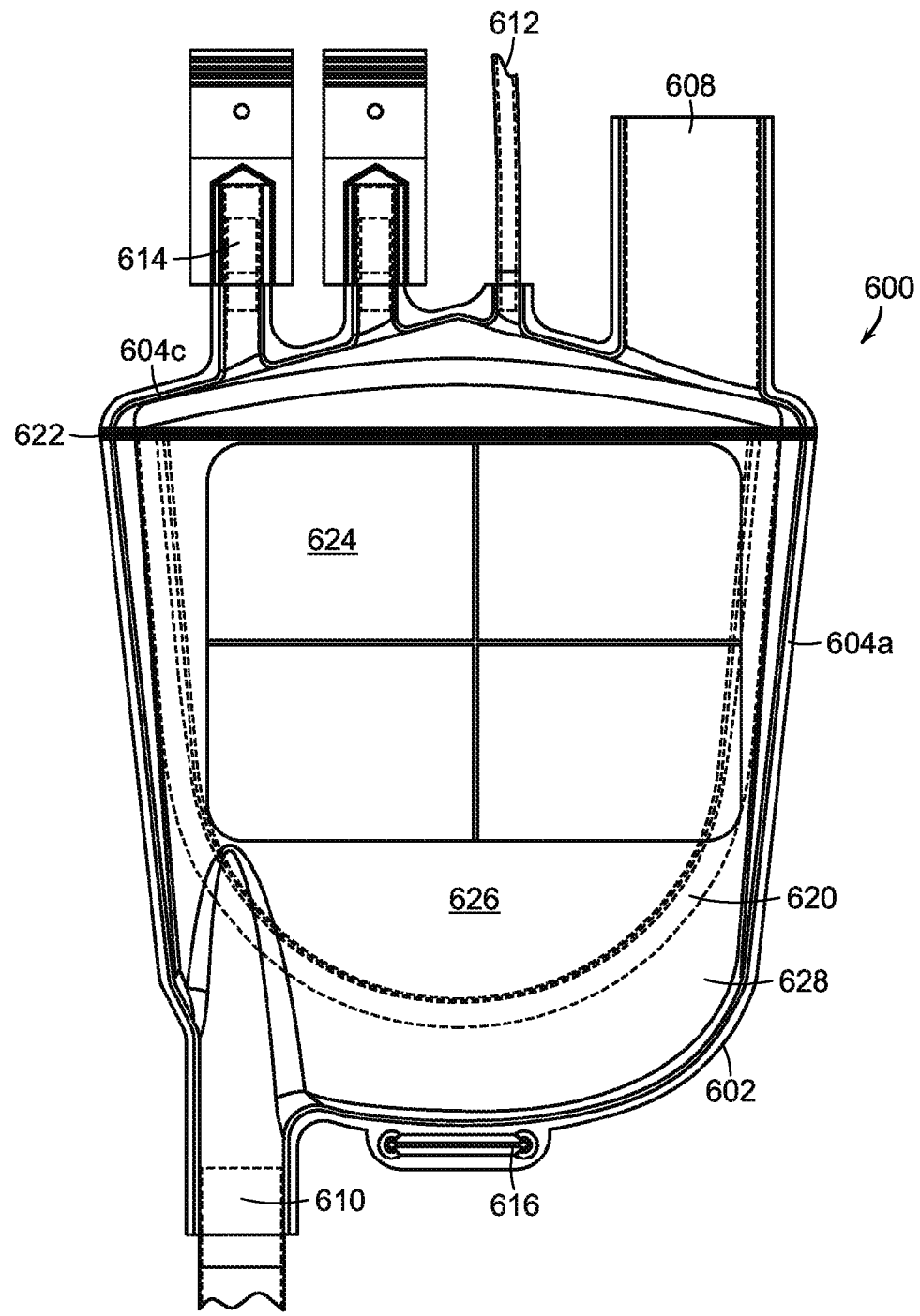
FIG. 14A illustrates a front view of an embodiment of a collection bag assembly.
Figure 14B:
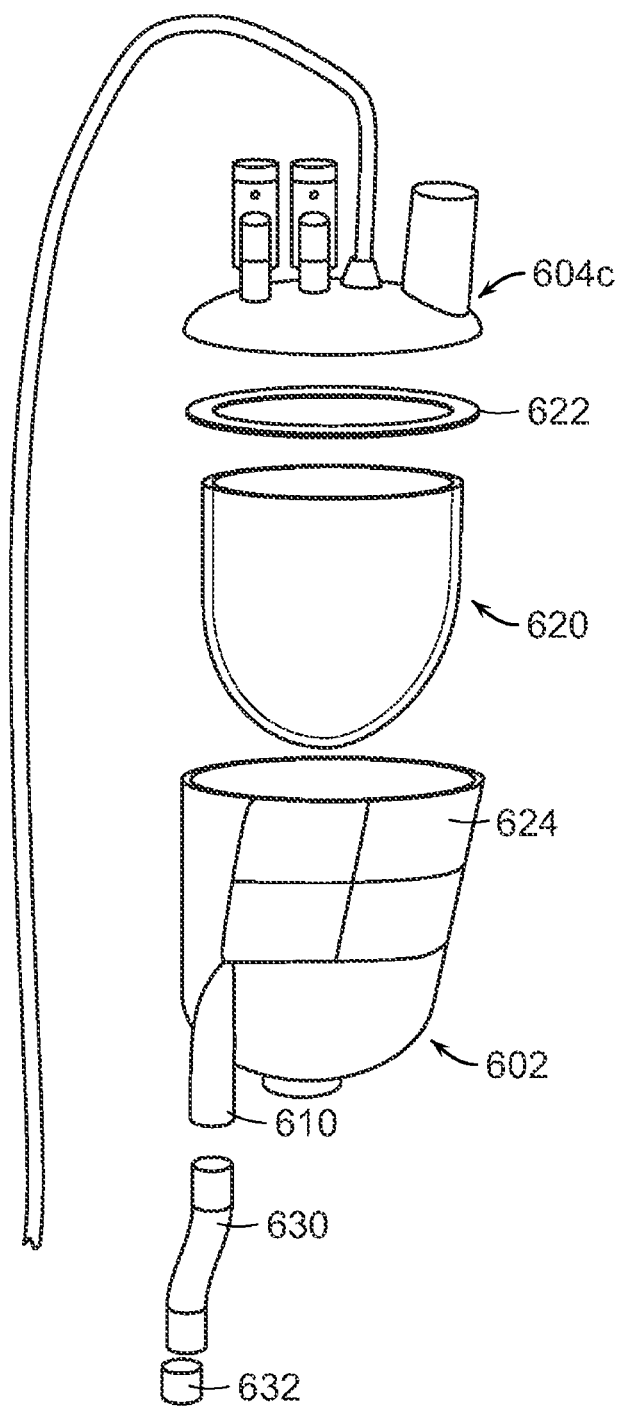
FIG. 14B illustrates an exploded view of an embodiment of a collection bag assembly.

A front view of an embodiment of a collection bag assembly 600 is illustrated in FIG. 14A. The collection bag assembly 600 includes an outer bag 602 including an inlet port 608 and an exhaust port 610. In the illustrative example, the outer bag 602 is formed from three components: a first side wall 604a, a second side wall (not shown), and a top wall section 604c. The side walls can be joined together along seams to form an enclosed, fluid-tight volume, but for the inlet and exhaust ports 608, 610.

A filter 620 is suspended within the outer bag 602, dividing the outer bag into two chambers: a collection chamber 626 and an outer chamber 628. The collection chamber is open to the inlet port 608; whereas, the outer chamber is open to the exhaust port 610. In at least some embodiments, the collection bag assembly 600 includes a filter support 622. The filter support 622 can be made from semi-rigid material, such as a plastic, PVC, and the like. In the illustrative example, the filter support 622 is located at an interface between the filter 620 and the outer bag 602. The filter 620 can be planar, for example, extending across an interior portion of the outer bag 602. Alternatively, the filter 620 can be non-planar, for example, forming a pouch shape within the outer bag 602.

In operation, a mixture of humid air and spray dried material (i.e., powder) enters the collection chamber 626 via the inlet port 608. The filter is selected to block passage of the spray dried material, while allowing humid air to pass through. An example filter is 0.22 micron hydrophobic filter. Such filters can be made from suitable materials, such as ePTFE or PVDF. Example filters include a 0.22 micron PVDF DURAPORE® commercially available from Millipore of Billerica, Mass. and ePTFE 0.22 micron GORE® membrane filters, commercially available from W.L. Gore & Associates.

In at least some embodiments, the collection bag 600 is configured with one or more additional features. Examples of such features include one or more ports for accessing the collection chamber. In the illustrative embodiment two such ports, generally known as "spike" ports 614 are shown. Alternatively or in addition, other interfaces, such as a tubing 612 can be provided. Once again, the tubing 612 is in fluid communication with the collection chamber. The collection bag assembly 600 may also contain a mounting flange 616, for example, to hang the bag from an IV pole and a label 624 suitable for identifying information related to the collected sample (e.g., sample identification, date).

An exploded view of an embodiment of a collection bag assembly 600 is illustrated in FIG. 14B. In particular, the illustrated embodiment includes an exhaust extension conduit 630 attachable at one end to the exhaust port 610. An opposite end of the exhaust extension conduit 630 can be terminated with an exhaust port cap 632. In at least some embodiments, the exhaust port cap 632 is provided as a "spike" style port. It should be noted that any spike style port at the exhaust port cap 532, although similar in application to traditional Spike ports, will generally be much larger due to the relative dimensions between the exhaust port (relatively large) and any of the other ports (relatively small).

A perspective view of another embodiment of a collection bag assembly 600' is illustrated in FIG. 15. The collection bag assembly 600' includes an outer bag 602' having an inlet port 608' and an exhaust port 610'. A filter 620' is suspended within the outer bag 602', once again, dividing the outer bag into two chambers: a collection chamber 626' and an outer chamber 628'. The collection chamber 626' is open to the inlet port 608'; whereas, the outer chamber 628' is open to the exhaust port 610'.

In at least some embodiments, the collection bag assembly 600' includes a filter support 622'. In the illustrative example, the filter support 622' is located at a lower portion of the outer bag 602'. The filter 620' can be planar, for example, extending across an interior portion of the outer bag 602'. Alternatively, the filter 620' can be non-planar, for example, forming an inverted pouch shape, extending upward within the outer bag 602', away from the filter support 622' in a direction towards the inlet port 608'. It is envisioned that in at least some embodiments, the filter 620' is adapted to substantially remain in the inverted pouch position during operation (e.g., in the presence of pressurized drying air directed toward the exhaust port 610'. In such embodiments, it is understood that one or more additional filter supports can be provided to assist in maintaining such a shape.

A perspective, cross-sectional view of another embodiment of a collection bag assembly is illustrated in FIG. 16. The collection bag assembly 600" includes an outer bag 602" having an inlet port 608" and an exhaust port 610". A filter 620" is suspended within the outer bag 602", once again, dividing the outer bag into two chambers: a collection chamber 626" and an outer chamber 628". The collection chamber 626" is open to the inlet port 608"; whereas, the outer chamber 628" is open to the exhaust port 610".

In the illustrative embodiment, the filter 620" substantially defines the collection chamber 626". This can be accomplished, as shown, with the filter 620" forming an inner "bag" disposed within the outer bag 602". The inner filter 620" can be suspended from the top portion of the outer bag 602", for example, being attached to an inner portion of the outer bag 602" along a top seam 632". Alternatively or in addition, the inner filter 620" can be attached to other inner portions of the outer bag 620", for example, along one or more side seams 630".

Advantageously, attachments retain the filter 620" in place, forming the collection chamber 626". Pressure from the drying gas and powder entering through the inlet port 608" naturally expand the collection chamber 626", the filter retaining dried powder within the collection chamber 626", while allowing humid drying gas to enter the outer chamber 628". In at least some embodiments, the outer bag is dimensioned to be sufficiently larger than the collection chamber 626" to allow humid drying air to expand the outer chamber 628", effectively urging the outer bag 602" away from the filter surface, to inhibit blocking of the filter 620" by any inner surface of the outer bag 602". Humid drying gas is exhausted through the exhaust port; however, a dimensional restriction of the exhaust port 610" provides a backpressure promoting expansion of the outer bag 602".

Figure 17:
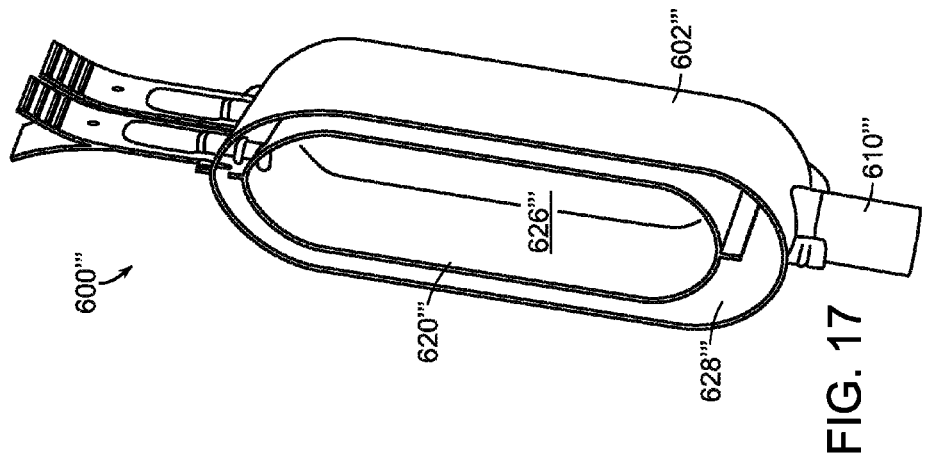
FIG. 17 illustrates a perspective, cross-sectional view of yet another embodiment of a collection bag assembly.

A perspective, cross-sectional view of yet another embodiment of a collection bag assembly is illustrated in FIG. 17. The collection bag assembly 600''' includes an outer bag 602''' having an inlet port (not shown) and an exhaust port 610'''. A filter 620''' is suspended within the outer bag 602''' dividing the outer bag 602''' into two chambers: a collection chamber 626''' and an outer chamber 628'''. The collection chamber 626''' is open to the inlet port 608'''; whereas, the outer chamber 628''' is open to the exhaust port 610'''.

Figure 16:
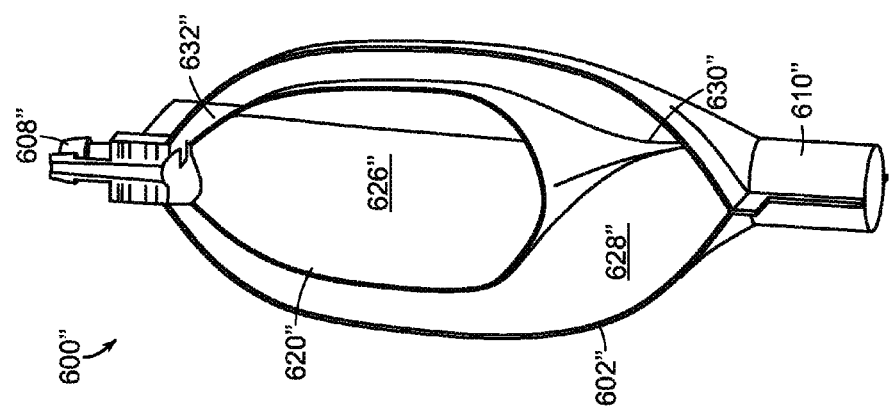
FIG. 16 illustrates a perspective, cross-sectional view of another embodiment of a collection bag assembly.
Figure 15:
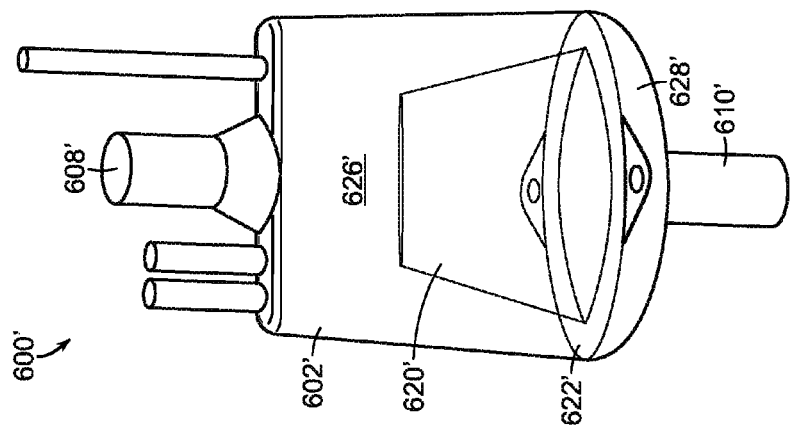
FIG. 15 illustrates a perspective view of another embodiment of a collection bag assembly.

In the illustrative embodiment, the filter 620" substantially defines the collection chamber 626'''. This can be accomplished, as shown, with the filter 620''' forming an inner "bag" disposed within the outer bag 602'''. The inner filter 620''' can be suspended from the top portion of the outer bag 602", for example, being attached to an inner portion of the outer bag 602" along conduits extending from the exhaust port 610''' and one or more other fluid interfaces. The illustrative embodiment can be distinguished from the previous example at least in that the filter 620''' need not be attached along any seams of the outer bag 602'''. For example, the filter 620''' can be formed as a stand-alone bag, essentially defining the entire inner chamber 626'''. Operation of such a collection bag assembly 600''' would be much the same as the previous embodiment illustrated in FIG. 16. In some examples, the inner filter 620''' does not extend the entire length of the outer bag 602''' to reduce and/or to prevent clogging of the exhaust port 610'''.

Upon completion of processing a liquid sample, any spray dried powder separated by any of the filtering techniques described herein, remains within a collection chamber of the collection bag assembly. The aerosolizing gas supply can be disabled or otherwise removed and any fluid pumping of the liquid sample can cease. The drying air supply can also be disabled in a similar manner. In at least some embodiments, the spray drying process is accomplished in a sterile volume at least defined between the liquid sample reservoir, input to the spray drying head, and the exhaust port. Thus, the spray drying process takes place in a sterile environment of the spray drying chamber, and the liquid sample is exposed to sterilized aerosolizing gas and sterilized drying air gas. The collection bag assembly can be sealed by any suitable technique to secure a collected powder sample within the collection bag, while maintaining sterility of the collected sample. For example, a thermal weld can be applied to each of the inlet port and outlet port of any of the collection bag assemblies described herein. The thermal weld substantially seals off either respective port from the external environment. Such a sealing process can be followed by a separation process, for example, whereby the intake port is separated from the spray drying chamber and the exhaust port is separated from any gas conduit coupled thereto.

Figure 18:
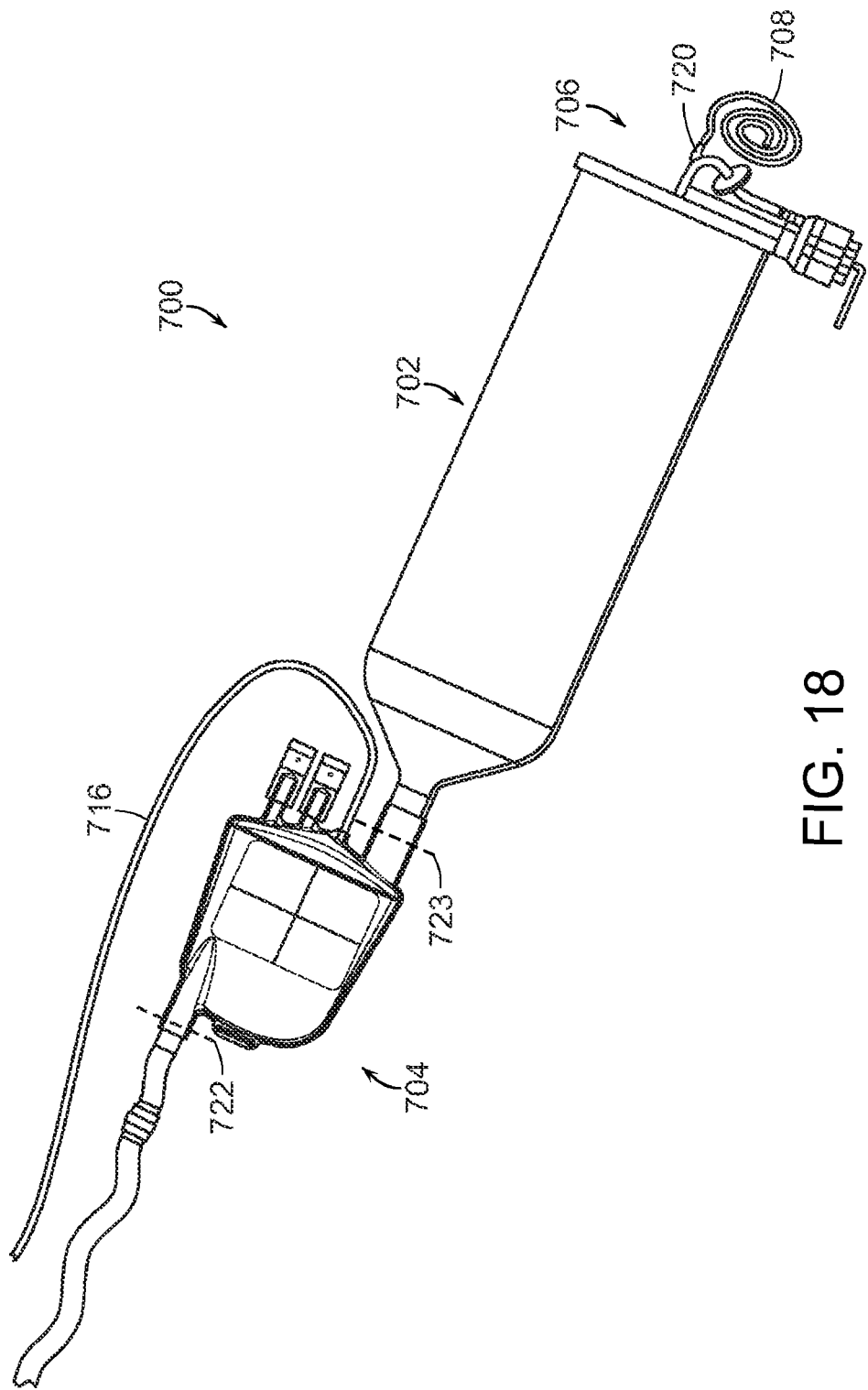
FIG. 18 illustrates a perspective view of a spray-drying chamber and collection assembly kit.

A perspective view of a spray-drying and collection assembly kit 700 is illustrated in FIG. 18. The kit 700 includes an in-line drying chamber 702, a collection bag assembly 704, a spray drying head assembly 706, and an elongated feed tube 708, terminated in one end with a male Luer lock fitting and sealed at the other end. The collection bag assembly 704 includes an intake sealing point 723 and an exhaust sealing point 722. In at least some embodiments, the collection bag assembly 704 is pre-attached to a length of sterile tubing 716. An end of the transfusion tube 716, opposite the collection bag assembly 704, can be pre-sealed, for example, by a thermal weld. When pre-sterilized, the pre-sealed end preserves sterility of the collection chamber which can otherwise be open to the attached length of tubing 716. In such embodiments, the tubing can represent transfusion-type tubing that can be accessed or otherwise joined to similar tubing and/or equipment as used in transfusing a rehydrated powder.

It is envisioned that such a collection assembly kit 700 can be provided as a disposable item in the overall context of the spray drying process. In at least some embodiments, such a disposable kit 700 is pre-sterilized and packaged in a sterilized container (e.g., a blister package, sealed from the environment, for example by a durable barrier, such as TYVEK®, a registered trademark of E.I. du Pont de Nemours and Company). The sterilized container can be opened in a controlled processing environment, and the components of the spray-drying and collection assembly interconnected to a liquid sample, gas supplies and other system components in such a manner as to preserve sterility of the processing and collection volumes.

Figure 19:
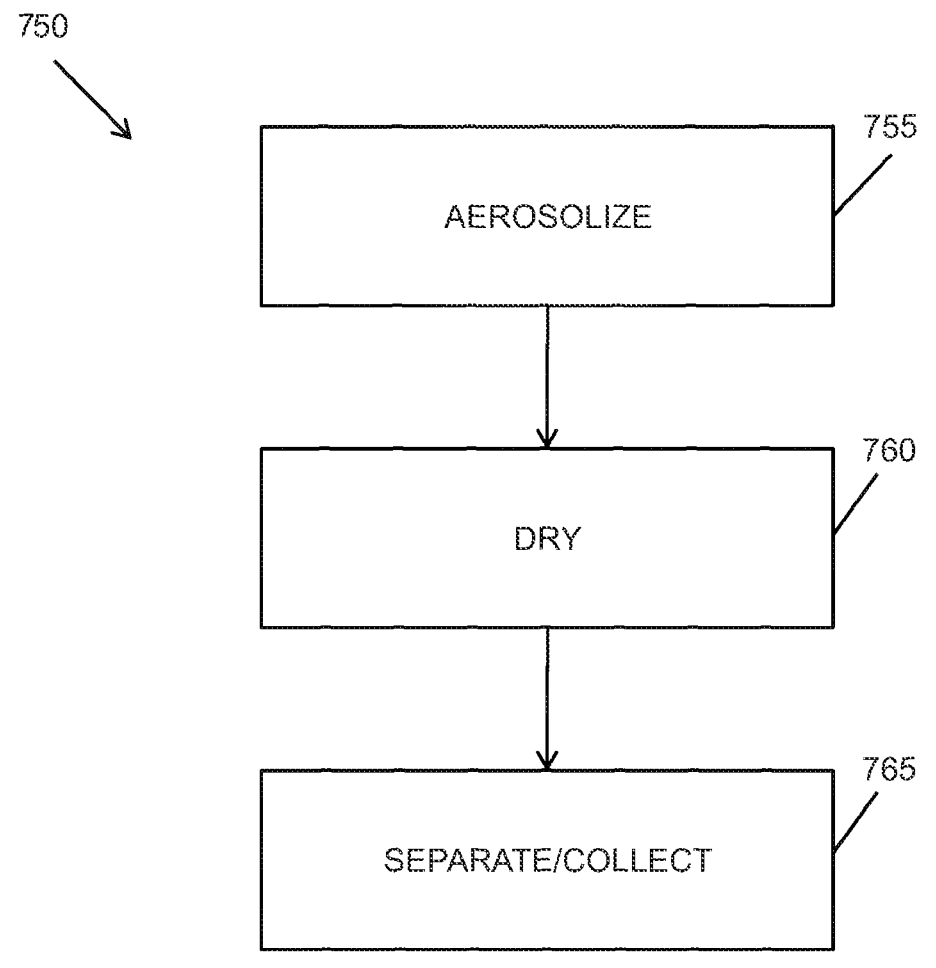

A flow diagram of an embodiment of process 750 for spray drying a liquid is illustrated in FIG. 19. The process includes aerosolizing a liquid sample at 755, drying the aerosolized liquid sample at 760, so as to produce a powder and humid air, and a combined separation of the humid drying air from the powder and collection of the powder at 765

Beneficially, a spray dried powder collected in the collection bag assembly can be rehydrated with a suitable fluid, such as a saline solution. Rehydration can be accomplished outside of the collection bag assembly by transferring the collected powder to a rehydration vessel. Preferably, however, at least with respect to blood processing applications, rehydration can be accomplished within the collection bag assembly. In such applications, a measured volume of rehydration fluid is added to the collection bag, for example, through an available port, such as one of the "spike" ports in the illustrated embodiments. Agitation can be applied to the powder-fluid mixture to achieve a desired rehydration. In at least some embodiments, such rehydrated fluid can be used in a treatment of a patient, for example, by transfusion. Thus, in at least some embodiments, such a rehydrated fluid can be transferred directly from the collection bag assembly to a patient. Such transfer can be accomplished, for example, by the available closed end sterile tubing (i.e., transfusion tube) and/or one or more available ports, such as the "spike" ports of the illustrative embodiments.

Figure 20:
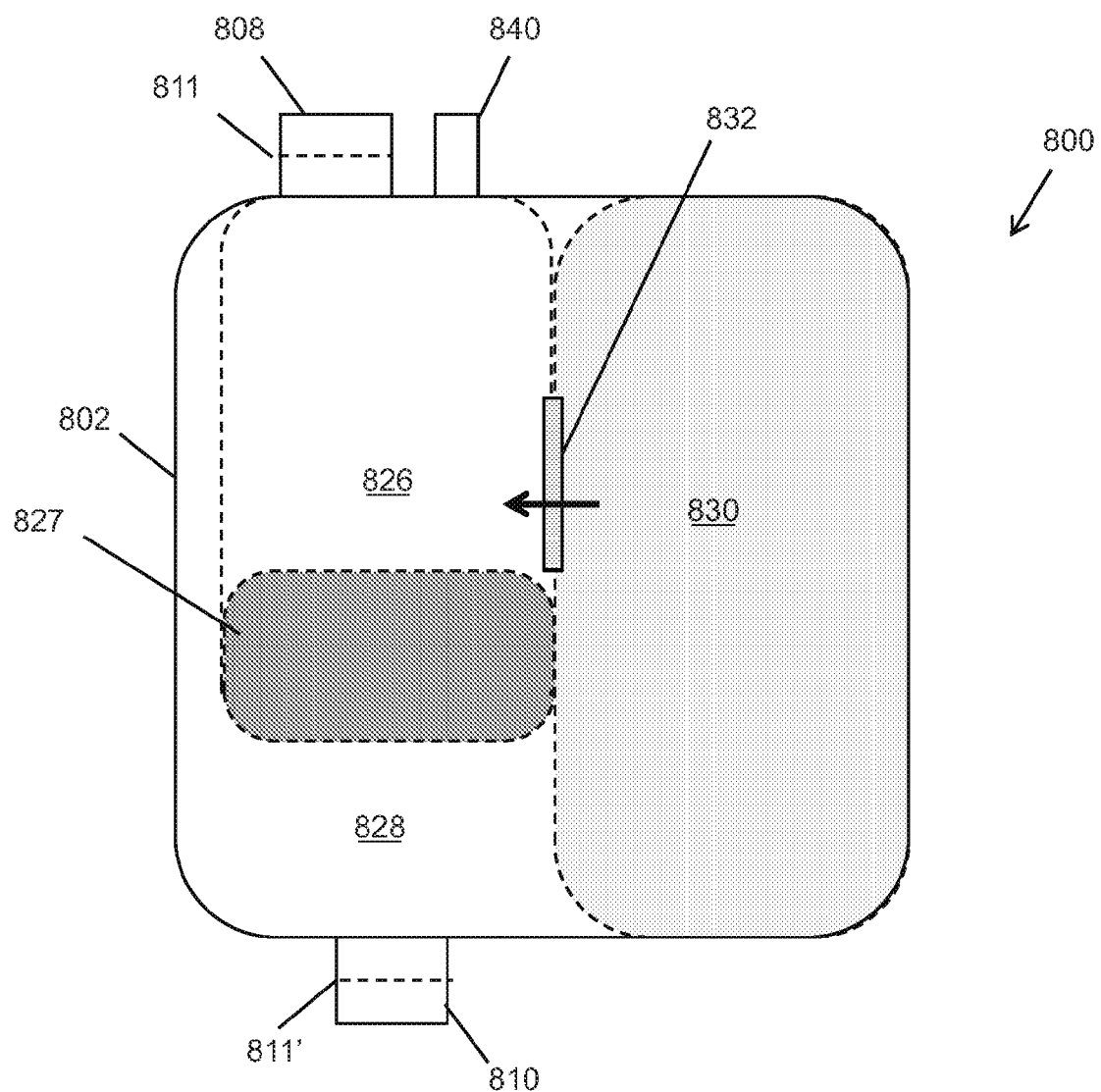
FIG. 20 illustrates a schematic diagram of an alternate collection bag assembly pre-configured for both powder collection and subsequent fluid rehydration.

It is understood that in at least some embodiments, a collection bag assembly can be pre-configured for both powder collection and subsequent fluid rehydration. For example, the collection bag assembly can include a rehydration fluid chamber. In some embodiments, the reconstitution fluid chamber can be pre-charged with a suitable measure of reconstitution fluid. An embodiment of such an assembly is schematically represented in FIG. 20. The collection bag assembly 800 includes an outer bag 802 having an inlet port 808 and an exhaust port 810. A filtered collection chamber 826 is disposed within the outer bag 802. An outer chamber 828 is provided in an area between the filtered collection chamber 826 and the exhaust port 810. Sealing regions 811, 811' are illustrated by dashed lines on each of the intake and exhaust ports 808, 810.

The collection bag assembly 800 also includes a rehydration fluid reservoir 830. The rehydration fluid reservoir 830 can be provided in selective fluid communication with the collection chamber 826, for example, by way of a controllable flow valve 832. The valve 832 can be a frangible device, adapted to maintain isolation between the pre-charged rehydration fluid reservoir 830 and a collected powder 827, until such time as rehydration is desired. Such rehydration can be accomplished, for example, by manipulating the collection bag assembly 800, for example, by one or more of vigorous shaking, bending, stretching and application of pressure, for example, to fluid in the pre-charged rehydration chamber 830. Rehydrated fluid can be accessed by a transfusion port 840.

Figure 21:
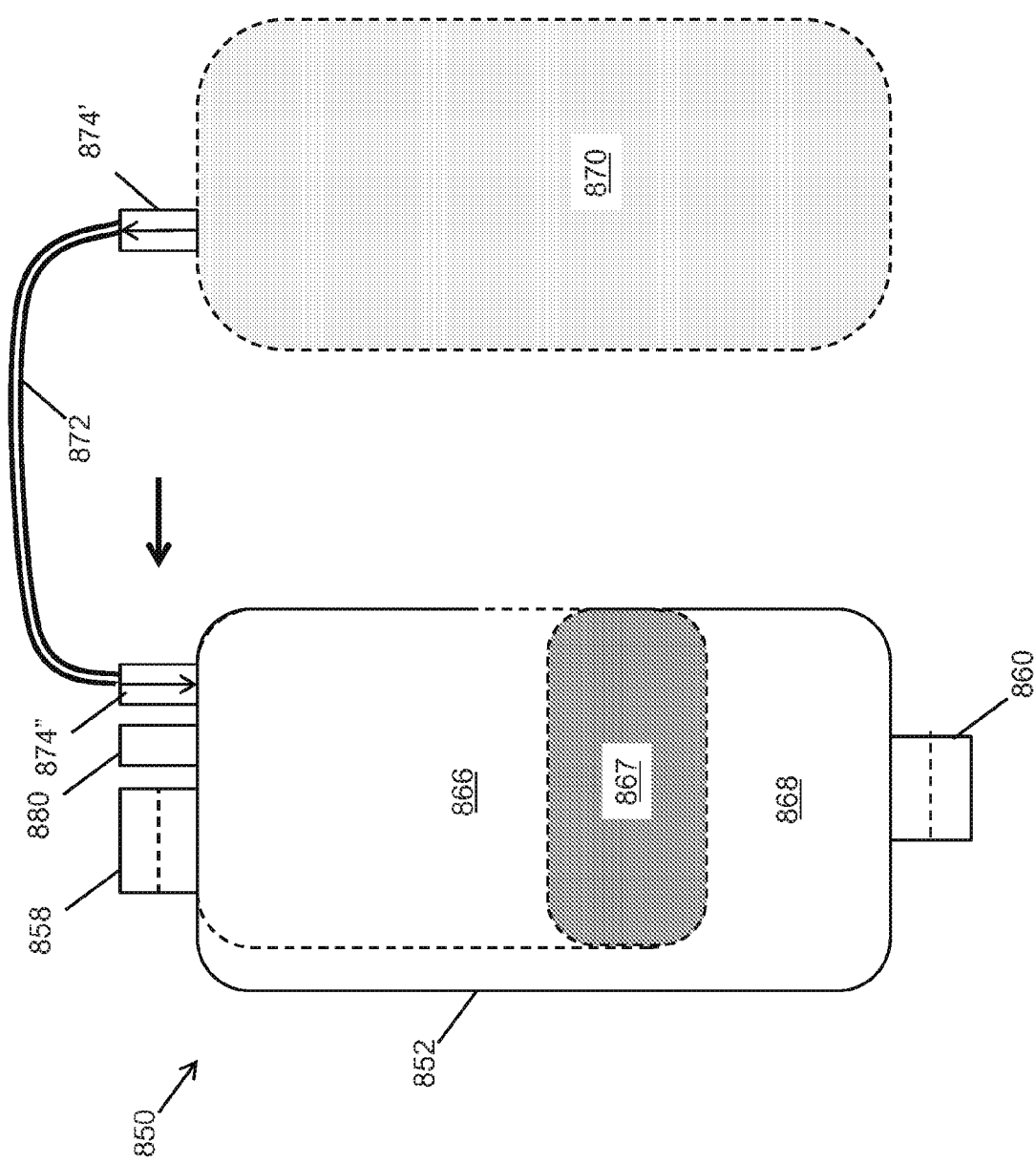
FIG. 21 illustrates a schematic diagram of another alternate collection bag assembly with a separate chamber usable for fluid rehydration.

Another embodiment rehydration is schematically represented in FIG. 21. A collection bag assembly 850 includes an outer bag 852 having an inlet port 858 and an exhaust port 860. A filtered collection chamber 866 is disposed within the outer bag 852. An outer chamber 868 is provided in an area between the filtered collection chamber 866 and the exhaust port 860. A separate rehydration fluid reservoir 870 is provided. The rehydration fluid reservoir 870 can be connected via a flowline 872 to provide selective fluid communication with the collection chamber 866. For example, by way of one or more controllable flow valves 874', 874" (generally 874). One or more of the valves 874 can be a frangible device, adapted to maintain isolation between the pre-charged rehydration fluid reservoir 870 and a collected powder 867, until such time as rehydration is desired. Such rehydration can be accomplished, for example, by manipulating the fluid reservoir 870, for example, by application of pressure, for example, to fluid in the pre-charged rehydration chamber 870. Rehydrated fluid can be accessed by a transfusion port 880.

Generally, the devices and techniques described herein are scalable. For example, and without limitation, any of the devices and techniques described herein can be applied to single units of blood. It is also envisioned that any of the devices and techniques described herein can also be applied to liquid samples larger than typical blood units. For example, such larger samples can be obtained from pooled multi-unit blood samples. More generally, there is no apparent limit to the scalability of the devices and techniques described herein. Where any dimensions have been included or suggested, it is by way of example only and intended without limitation. Thus, any of the reservoirs and collection chambers described herein and equivalents thereto can be sized and shaped to accommodate processing of single units (e.g., 450 ml liquid blood product), pooled units (e.g., multiples of the standard units), or any suitable size and shape as may be necessary to accommodate liquid blood products and spray dried blood products processed by the system.

Although the illustrative examples describe herein are generally directed to the processing of human blood products, such as plasma, the disclosure is by no means meant to be limiting in any such regard. For example, devices and techniques described and claimed herein can more generally be directed to the separation of components from a fluid mixture through spray drying. Such applications can include processing of protein as used in animal feed, processing as used in pharmacy applications. More generally, the systems, devices and processes described herein can be directed to treating mammalian blood products, to include veterinary applications.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A spray drying collection device, comprising:
   an inlet port in fluid communication with the opposite end of a drying chamber;
   a filter separating dried powder from humid air; and
   an exhaust port allowing the humid air to exit the collection device.

2. The spray drying collection device of claim 1, further comprising an outer wall, in which the inlet port and exhaust port are disposed along opposite sides.

3. The spray drying collection device of claim 2, wherein the filter is disposed within the outer wall.

4. The spray drying collection device of claim 3, further comprising a filter support attaching the filter to the outer wall.

5. The spray drying collection device of claim 1, the filter forms a pouch-shaped collection chamber.

6. The spray drying collection device of claim 5, wherein the pouch-shaped collection chamber is sized to accommodate dried powder resulting from processing of a single unit of liquid sample of a volume of no more than about 450 ml (about 0.951 pints).

7. The spray drying collection device of claim 1, further comprising a rehydration fluid and means for selectively combining the rehydration fluid with the dried powder.

8. The spray drying collection device of claim 2, wherein a volume defined by the outer wall is sized to accommodate a single unit of liquid sample of a volume of no more than about 450 ml (about 0.951 pints).

9. The spray drying collection device of claim 1, wherein the filter comprises a filter media capable of creating a sterile barrier.

* * * * *